(12) United States Patent
Jang

(10) Patent No.: US 11,190,790 B2
(45) Date of Patent: Nov. 30, 2021

(54) PARALLEL PROCESSING METHOD FOR COLOR COMPONENT OF VIDEO SIGNAL, AND DEVICE THEREFOR

(71) Applicant: LG ELECTRONICS INC., Seoul (KR)

(72) Inventor: Hyeongmoon Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/044,536

(22) PCT Filed: Apr. 1, 2019

(86) PCT No.: PCT/KR2019/003802
§ 371 (c)(1),
(2) Date: Oct. 1, 2020

(87) PCT Pub. No.: WO2019/194496
PCT Pub. Date: Oct. 10, 2019

(65) Prior Publication Data
US 2021/0112262 A1    Apr. 15, 2021

Related U.S. Application Data

(60) Provisional application No. 62/651,224, filed on Apr. 1, 2018.

(51) Int. Cl.
*H04N 19/00* (2014.01)
*H04N 19/44* (2014.01)
(Continued)

(52) U.S. Cl.
CPC .......... *H04N 19/44* (2014.11); *H04N 19/105* (2014.11); *H04N 19/132* (2014.11);
(Continued)

(58) Field of Classification Search
CPC .... H04N 19/44; H04N 19/105; H04N 19/132; H04N 19/159; H04N 19/176; H04N 19/186; H04N 19/70
See application file for complete search history.

(56) References Cited

U.S. PATENT DOCUMENTS

| 2017/0272748 A1* | 9/2017 | Seregin ................ H04N 19/186 |
| 2018/0077426 A1* | 3/2018 | Zhang .................. H04N 19/117 |

(Continued)

FOREIGN PATENT DOCUMENTS

| KR | 20120072357 | 7/2012 |
| KR | 20130050297 | 5/2013 |
| KR | 20170129750 | 11/2017 |

OTHER PUBLICATIONS

PCT International Search Report in International Appln. No. PCT/KR2019/003802, dated Jul. 19, 2019, 9 pages (with English translation).

*Primary Examiner* — Zhihan Zhou
(74) *Attorney, Agent, or Firm* — Fish & Richardson P.C.

(57) ABSTRACT

A method for parallel processing of color components of a video signal and an apparatus therefor are disclosed. Specifically, there is provided a method for decoding images based on an intra prediction mode, the method comprising: parsing a syntax element indicating whether a CCLM (cross-component linear model) intra prediction on a current chroma block is disabled or not; deriving an intra prediction mode applied to the current chroma block; and generating a prediction sample for the current chroma block based on the intra prediction mode, wherein, when the CCLM intra prediction is disabled, the intra prediction mode is derived in a predetermined first prediction mode set, when the CCLM intra prediction is not disabled, the intra prediction mode is derived in a predetermined second prediction mode set, and the second prediction mode set includes intra prediction (Continued)

modes included in the first prediction mode set and the CCLM intra prediction mode.

16 Claims, 23 Drawing Sheets

(51) Int. Cl.
*H04N 19/105* (2014.01)
*H04N 19/132* (2014.01)
*H04N 19/159* (2014.01)
*H04N 19/176* (2014.01)
*H04N 19/186* (2014.01)
*H04N 19/70* (2014.01)

(52) U.S. Cl.
CPC ......... *H04N 19/159* (2014.11); *H04N 19/176* (2014.11); *H04N 19/186* (2014.11); *H04N 19/70* (2014.11)

(56) References Cited

U.S. PATENT DOCUMENTS

2020/0260096 A1* 8/2020 Ikai ...................... H04N 19/176
2021/0136407 A1* 5/2021 Aono ..................... H04N 19/55

* cited by examiner

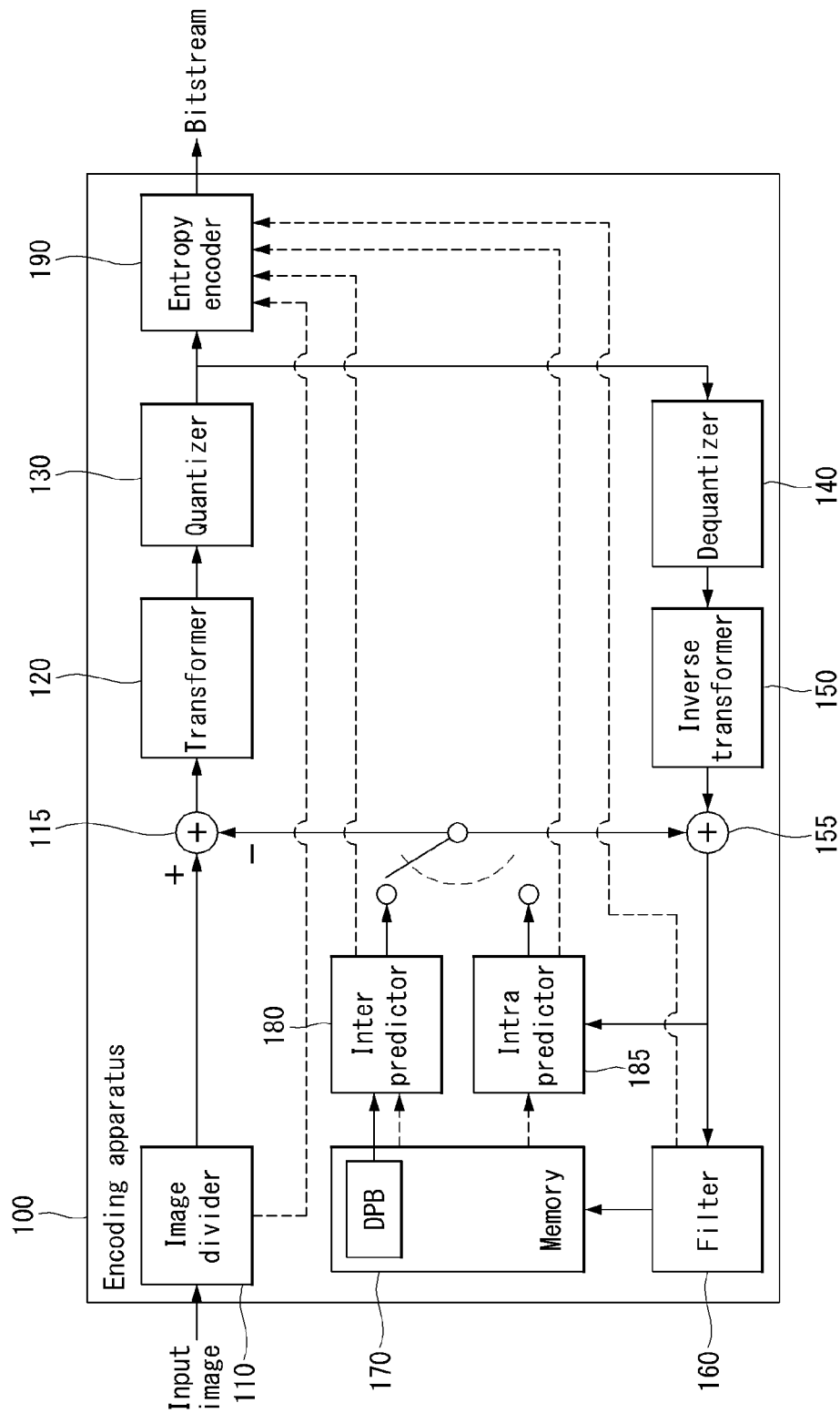
[FIG. 1]

[FIG. 2]
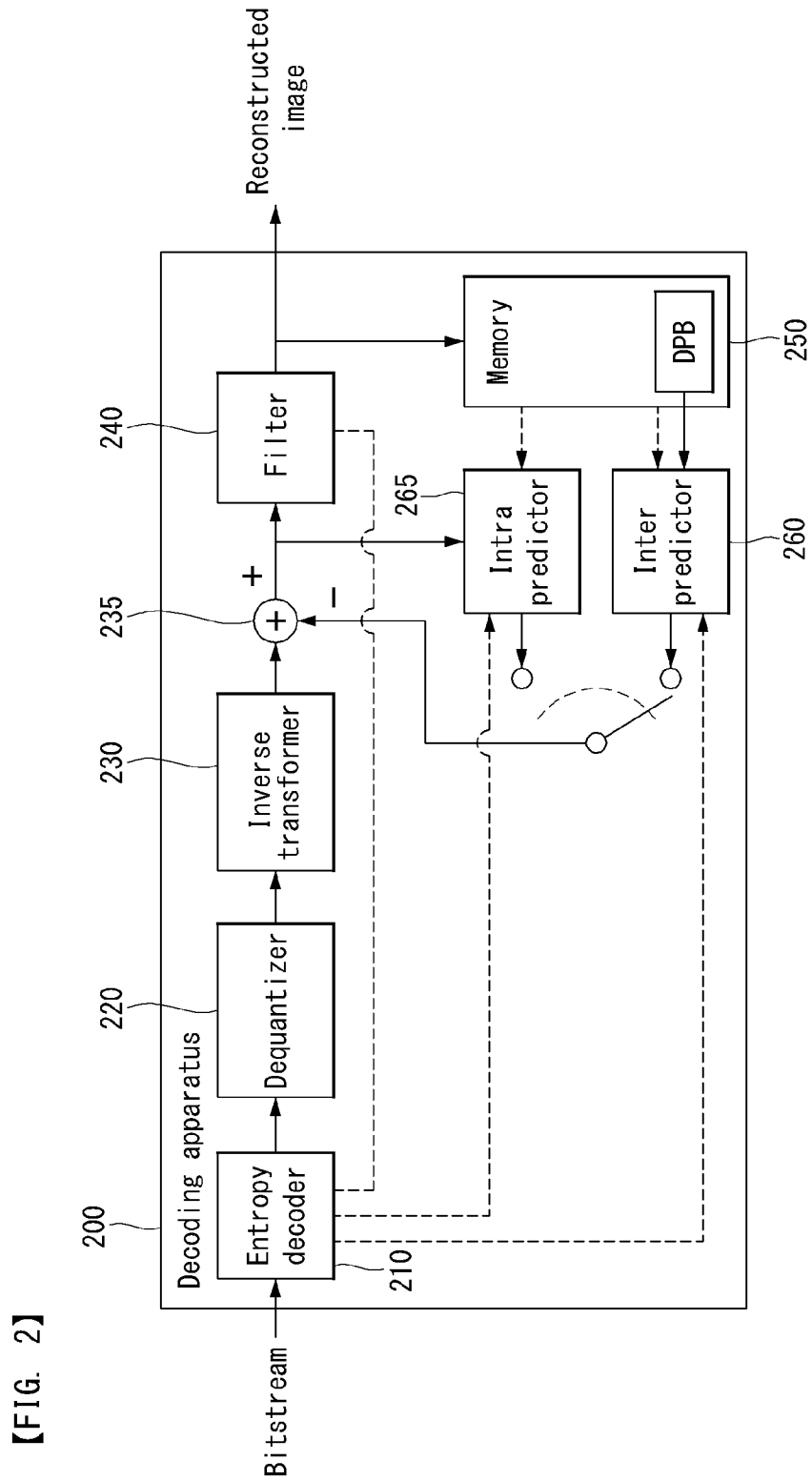

[FIG. 3]
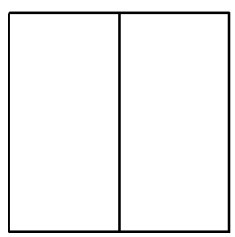 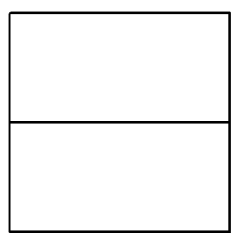 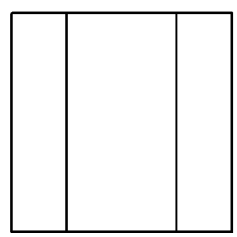 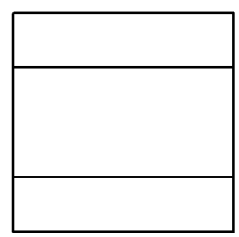
SPLIT_BT_VER    SPLIT_BT_HOR    SPLIT_TT_VER    SPLIT_TT_HOR

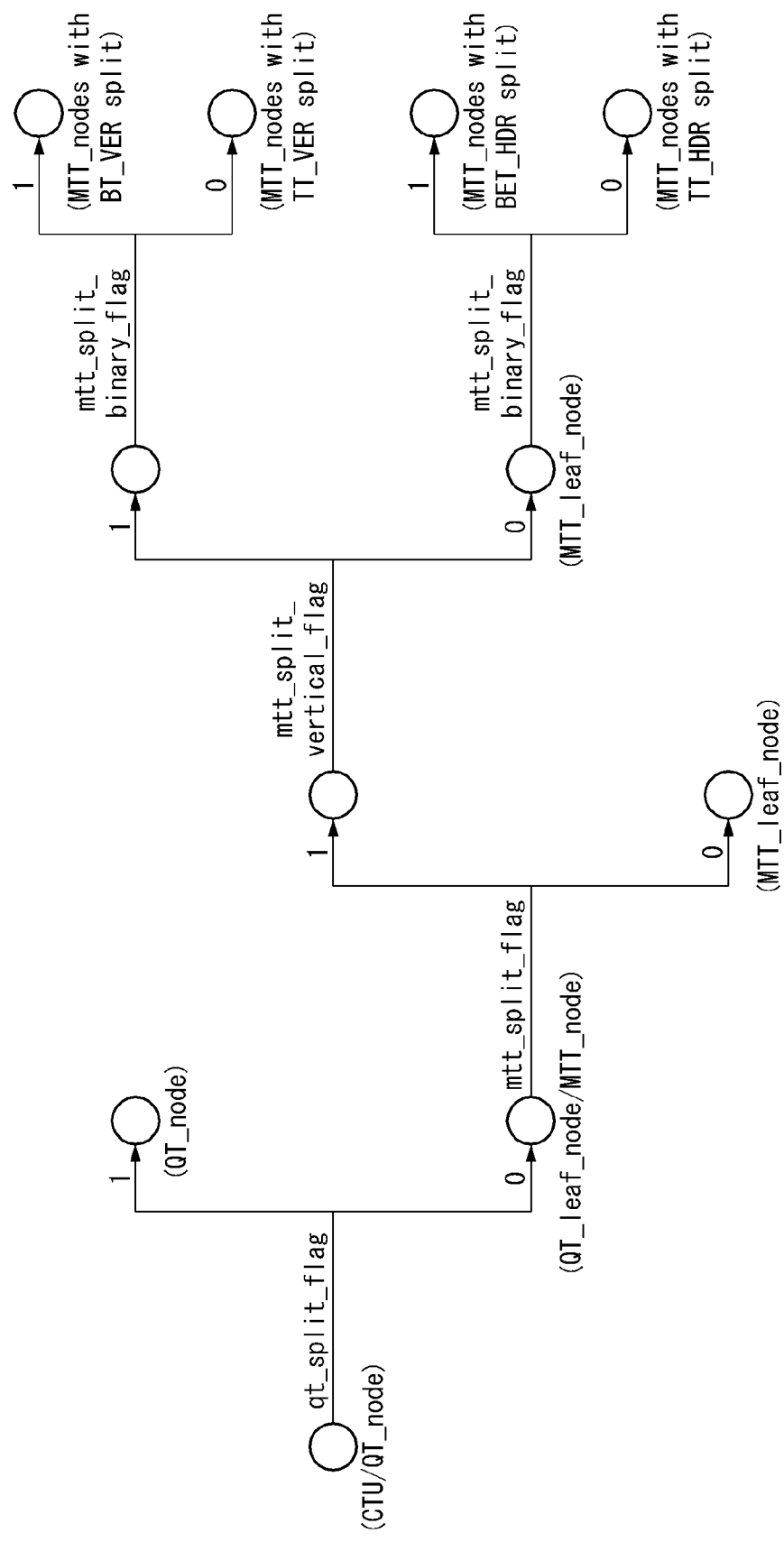
[FIG. 4]

[FIG. 5]
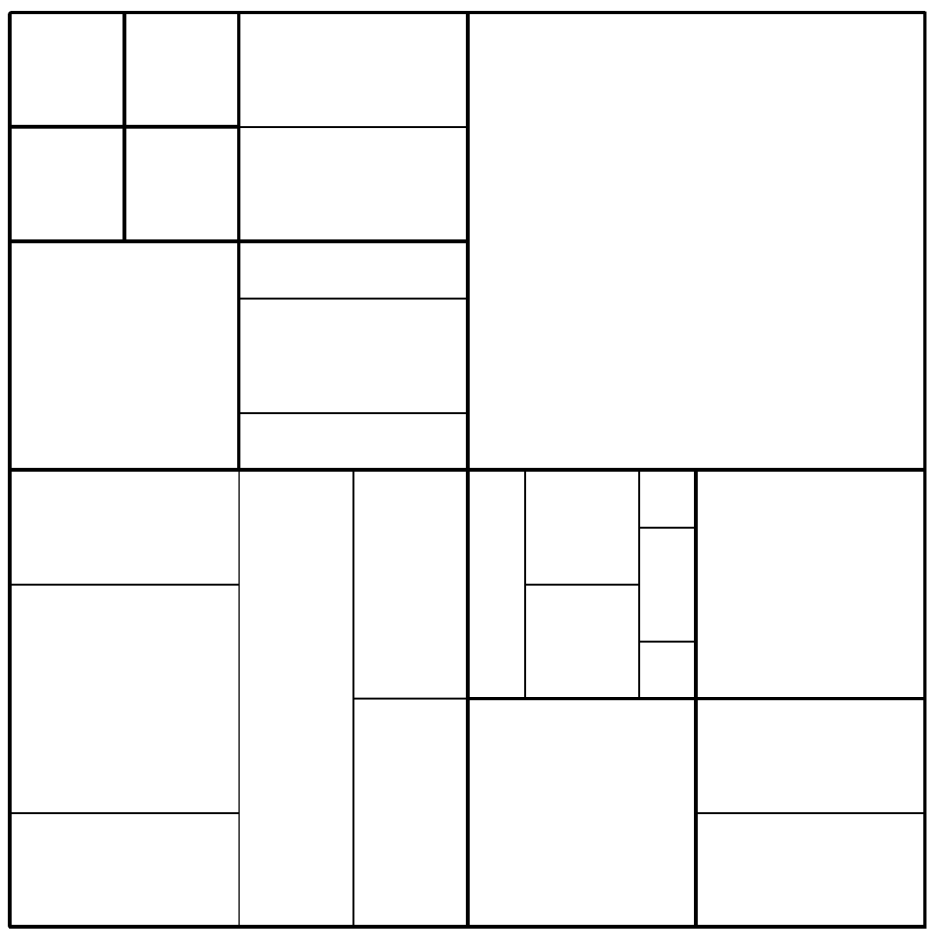

[FIG. 6]
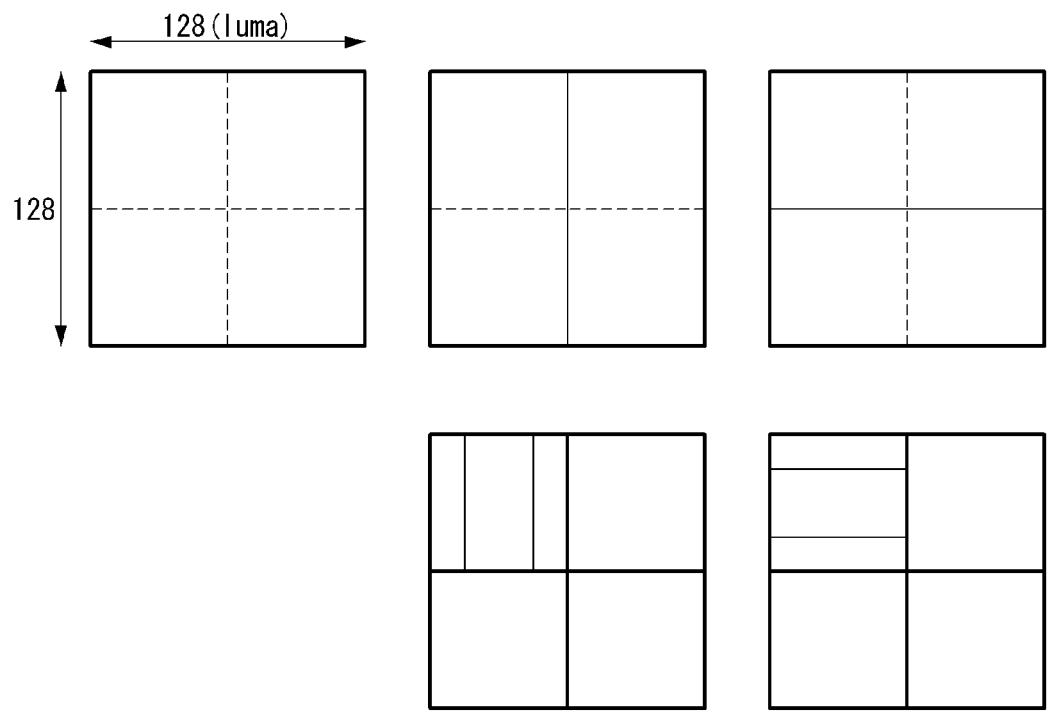
[FIG. 7]
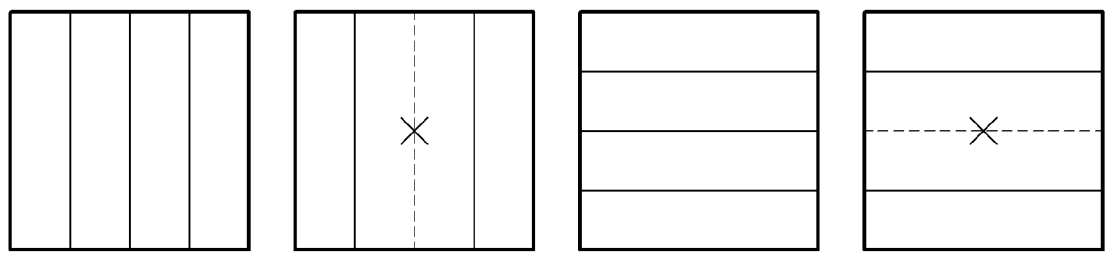

[FIG. 8]
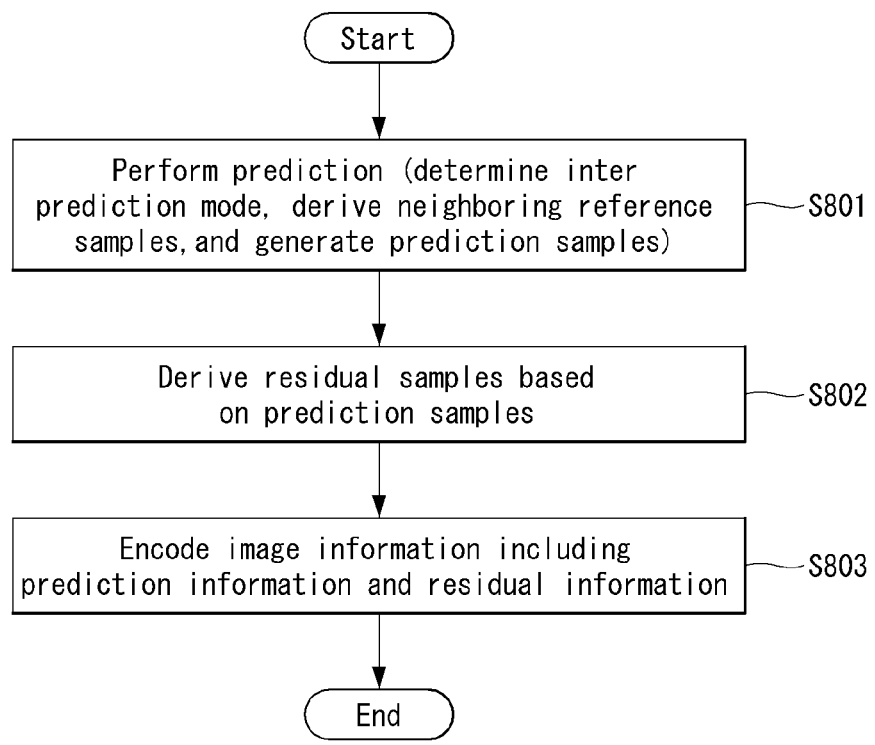
[FIG. 9]
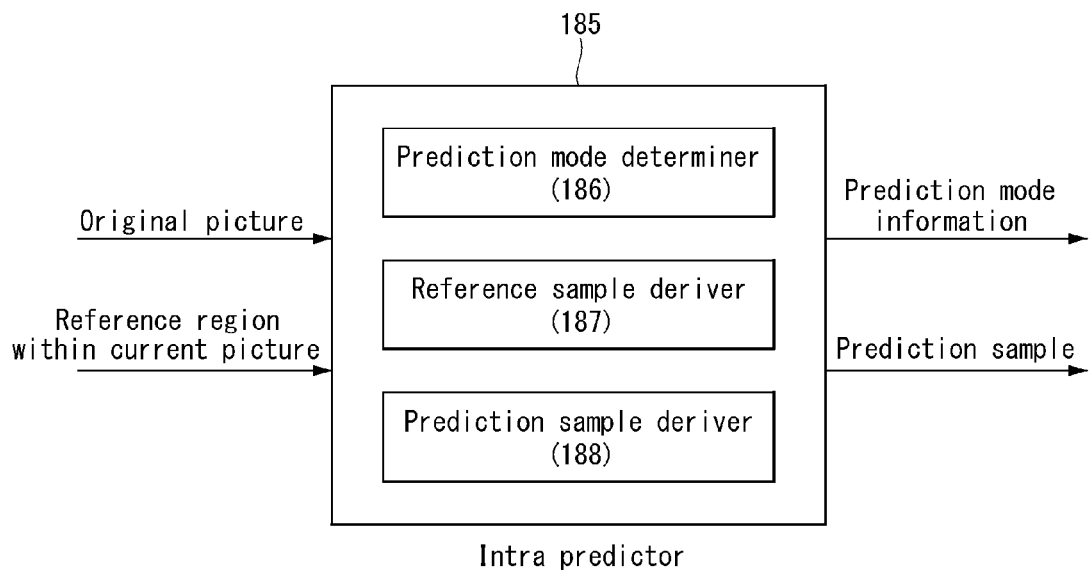

[FIG. 10]
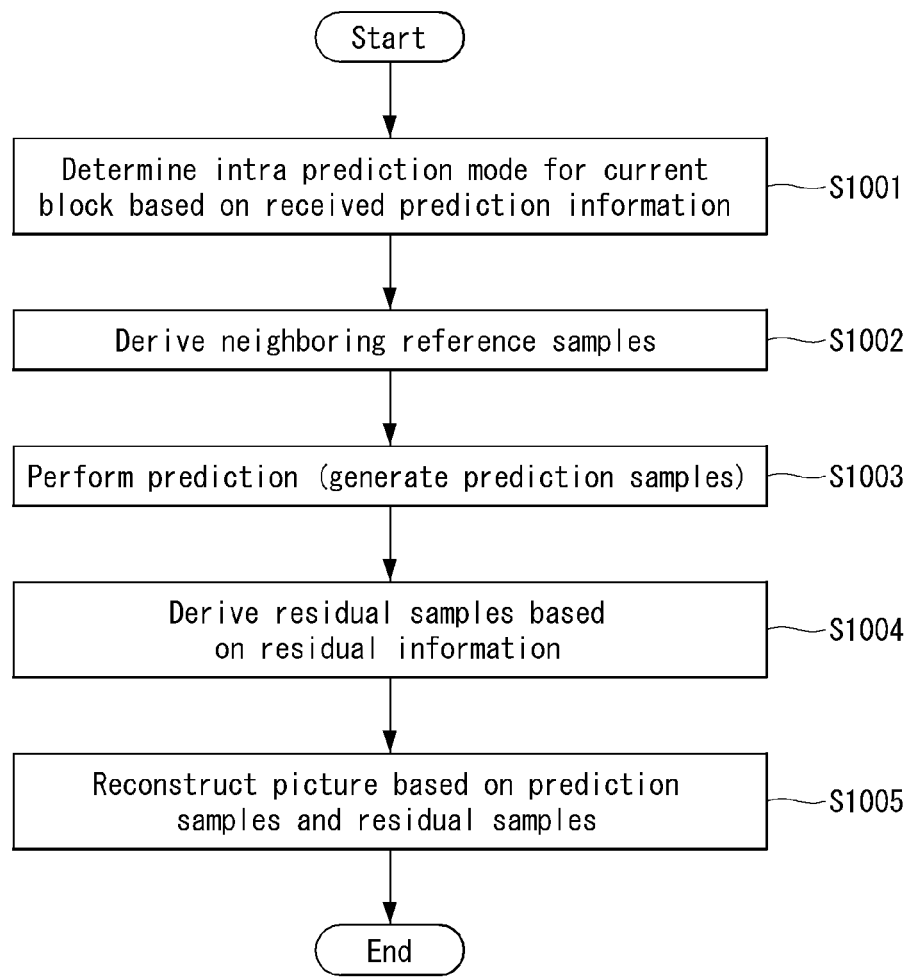

[FIG. 11]
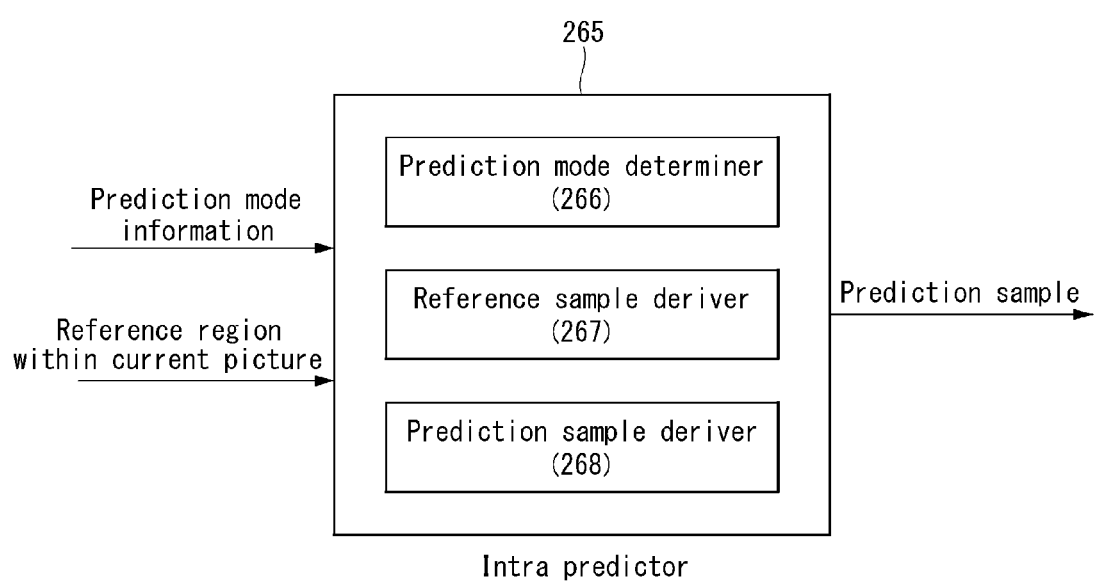

[FIG. 12]
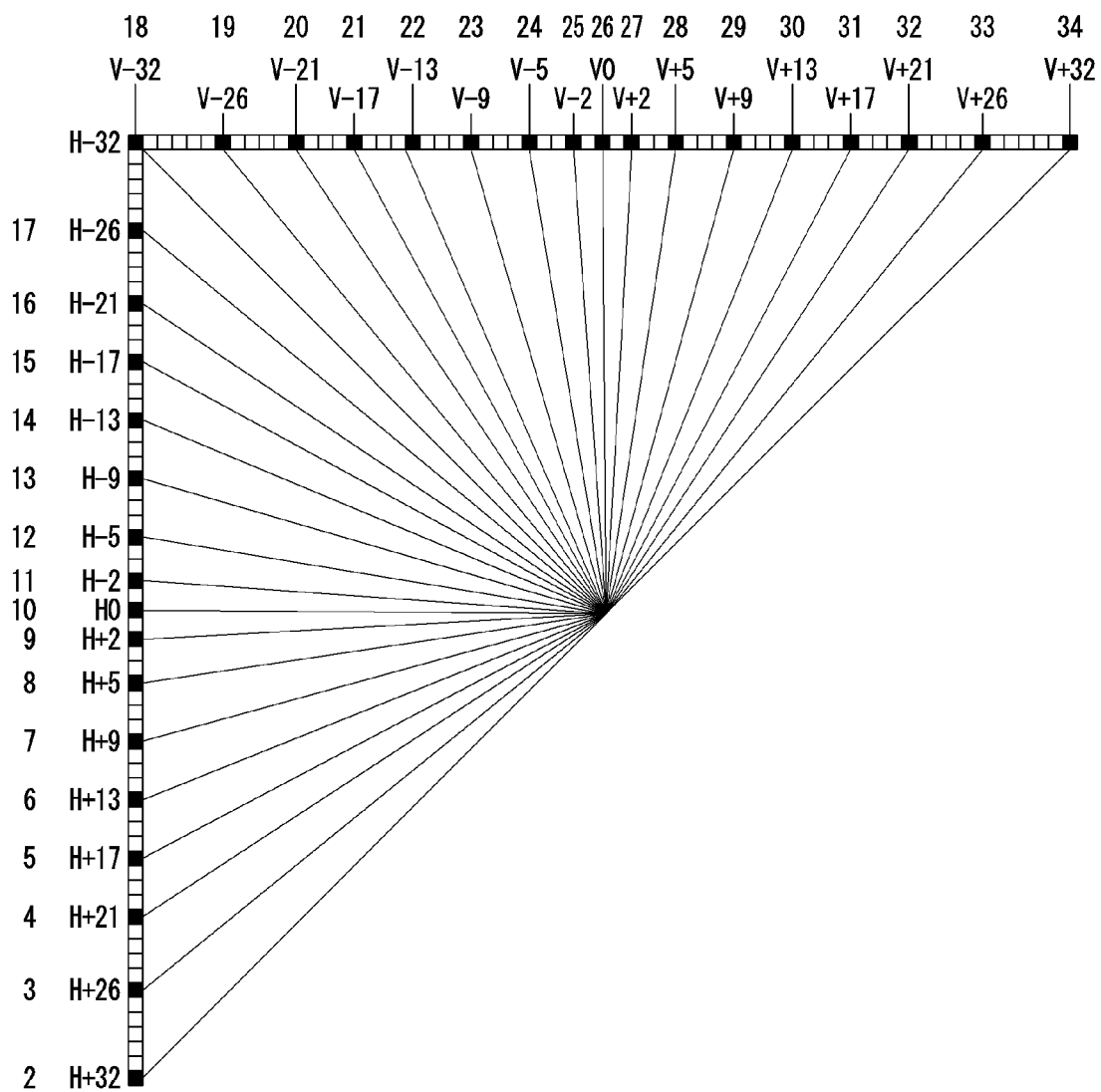

[FIG. 13]
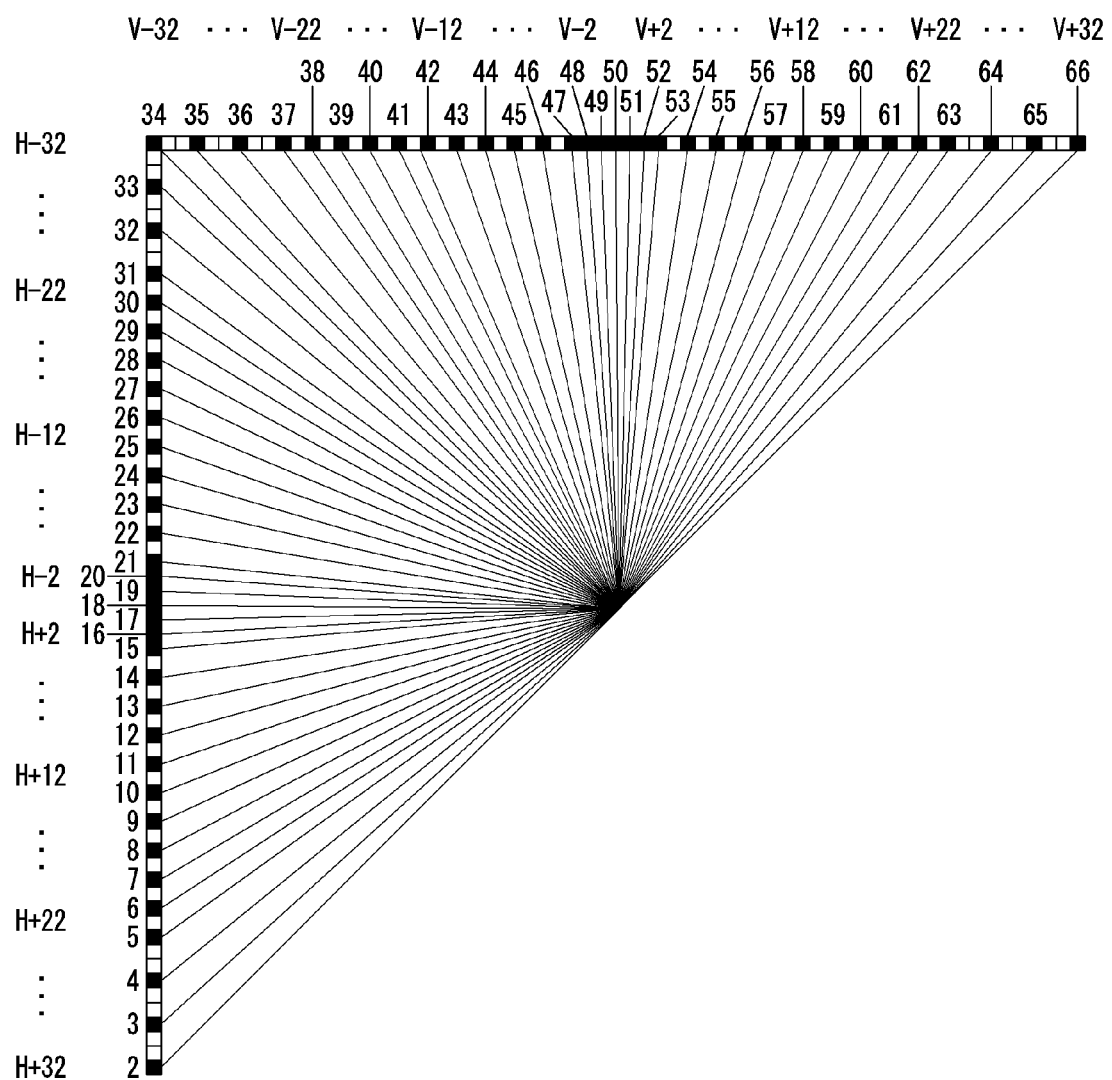

[FIG. 14]
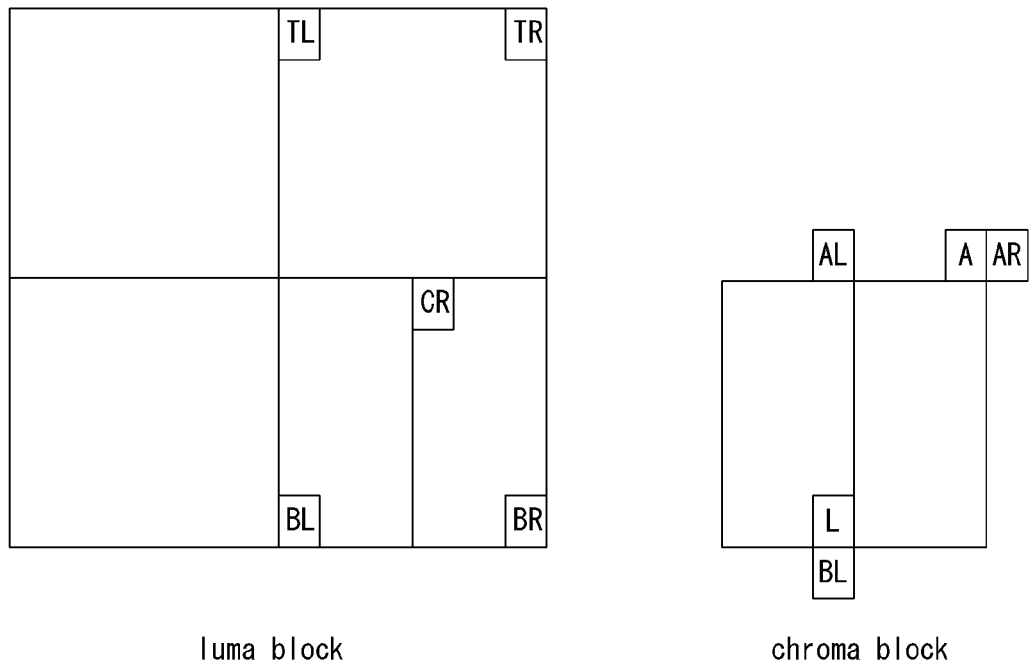
luma block                    chroma block
[FIG. 15]
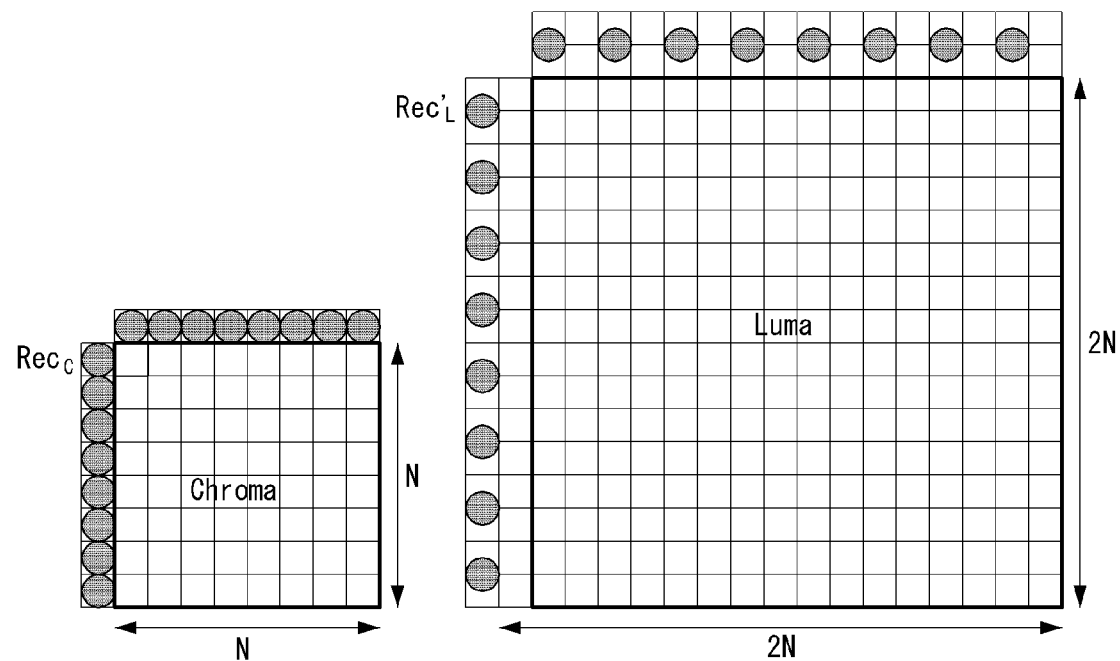

【FIG. 16】
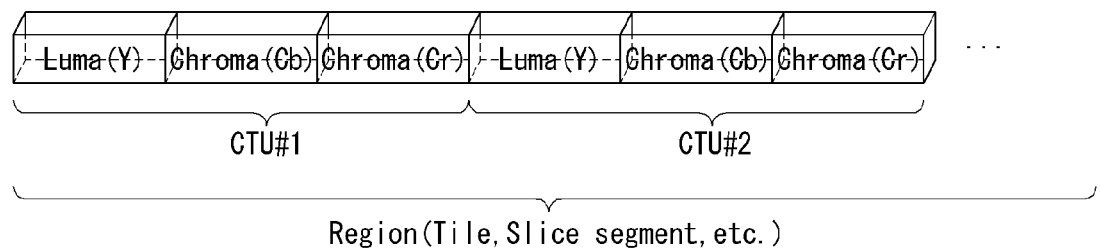

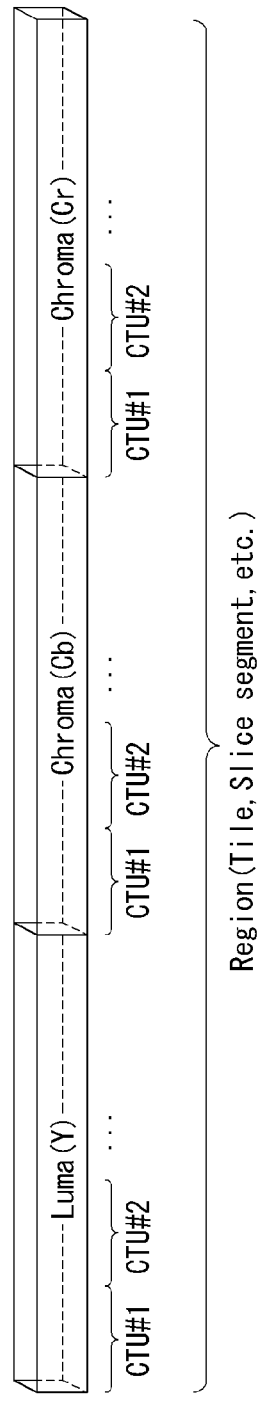
[FIG. 17]

【FIG. 18】
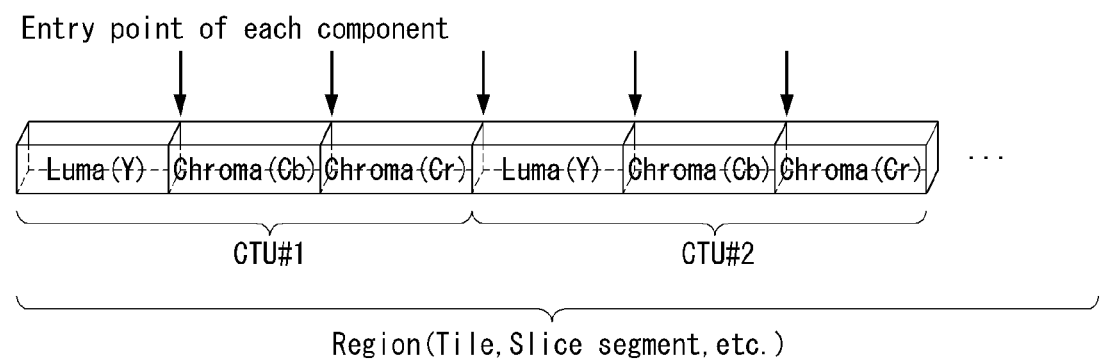

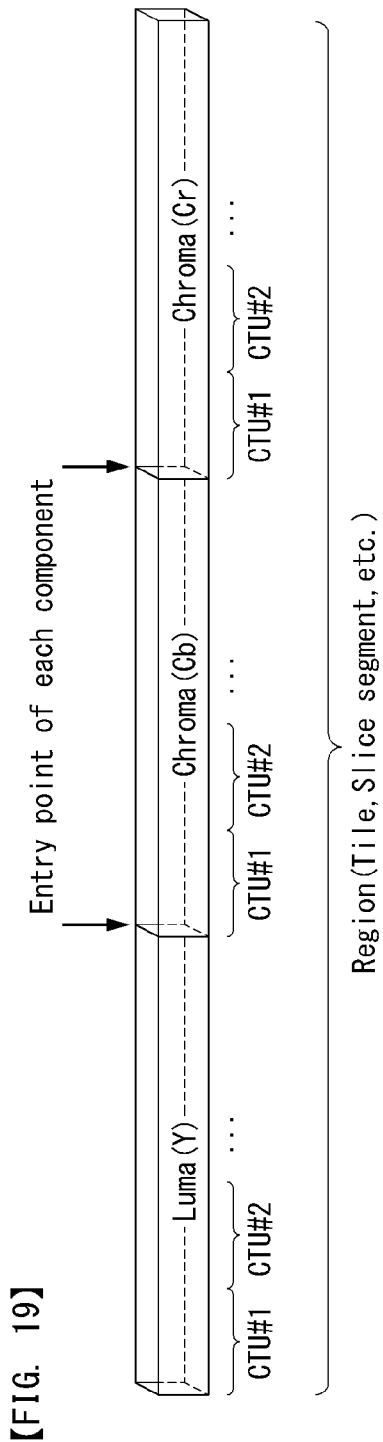

【FIG. 20】
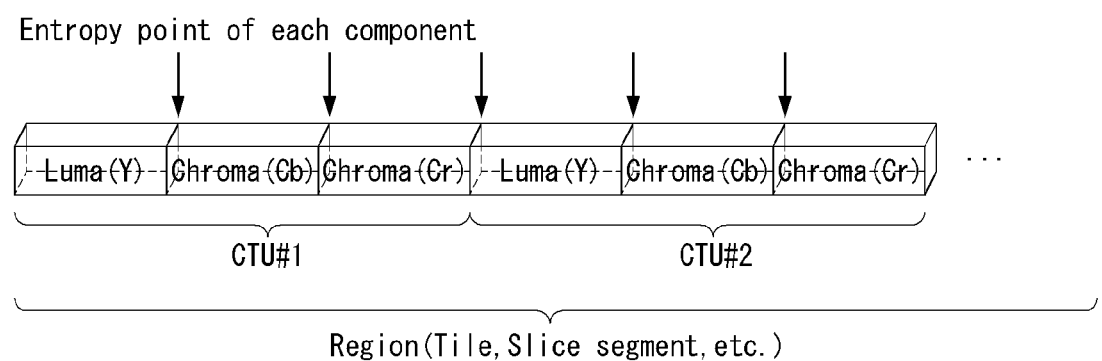

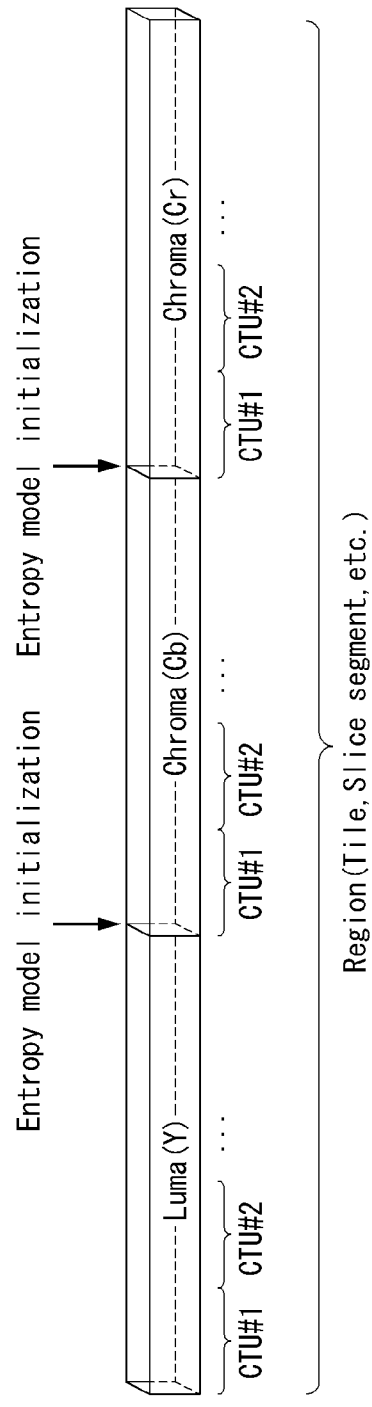
[FIG. 21]

[FIG. 22]
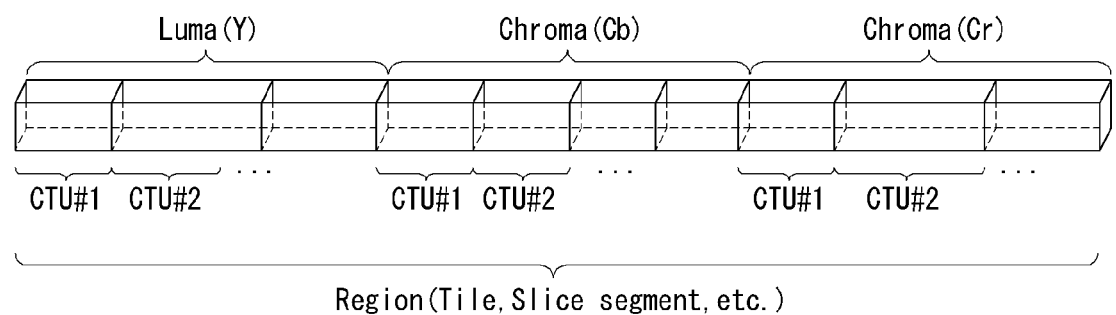
[FIG. 23]
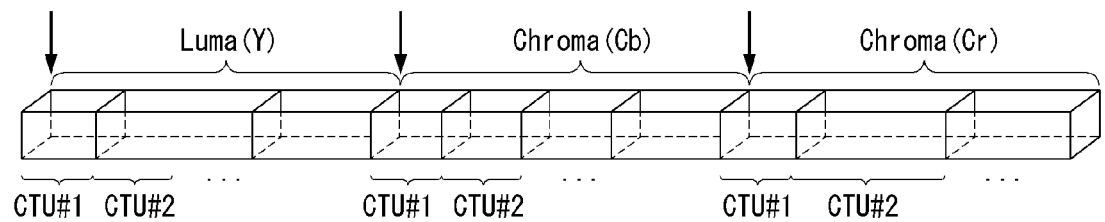

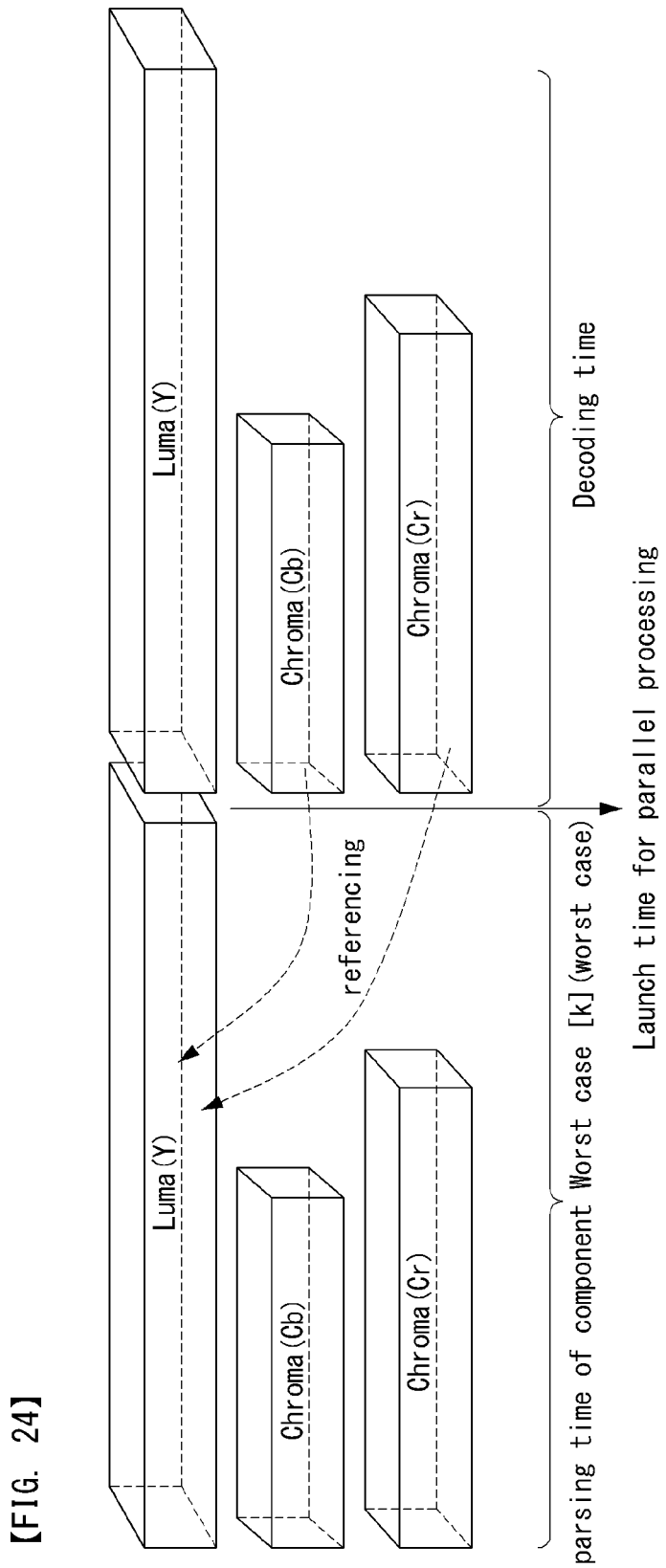
[FIG. 24]

【FIG. 25】
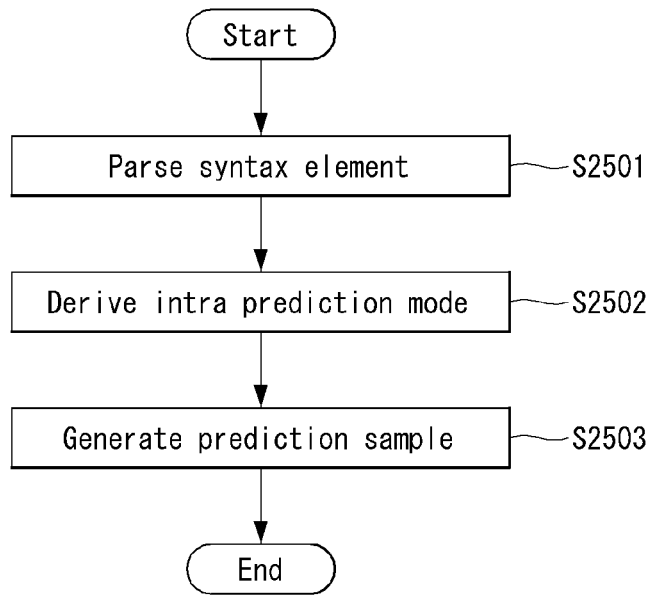
【FIG. 26】
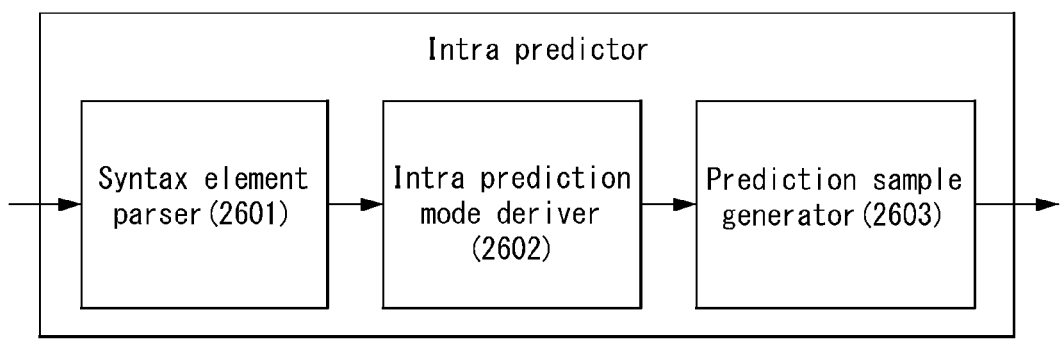

[FIG. 27]
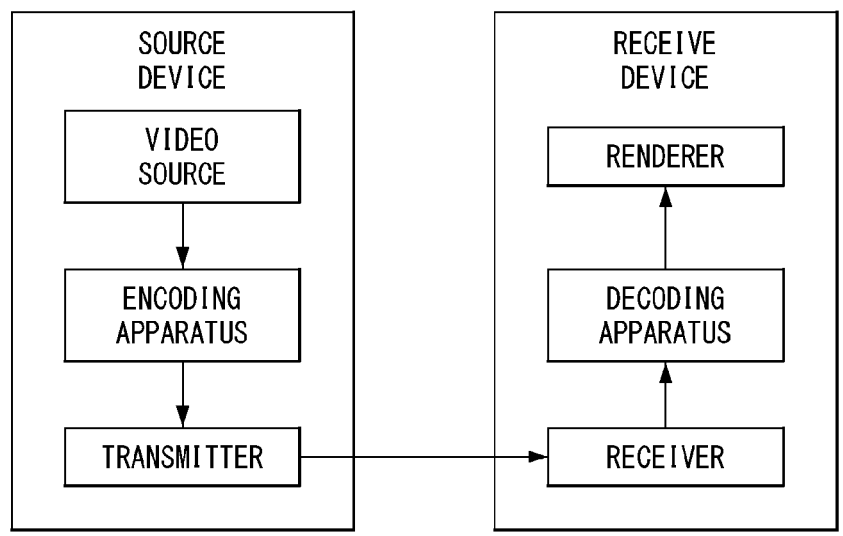

[FIG. 28]
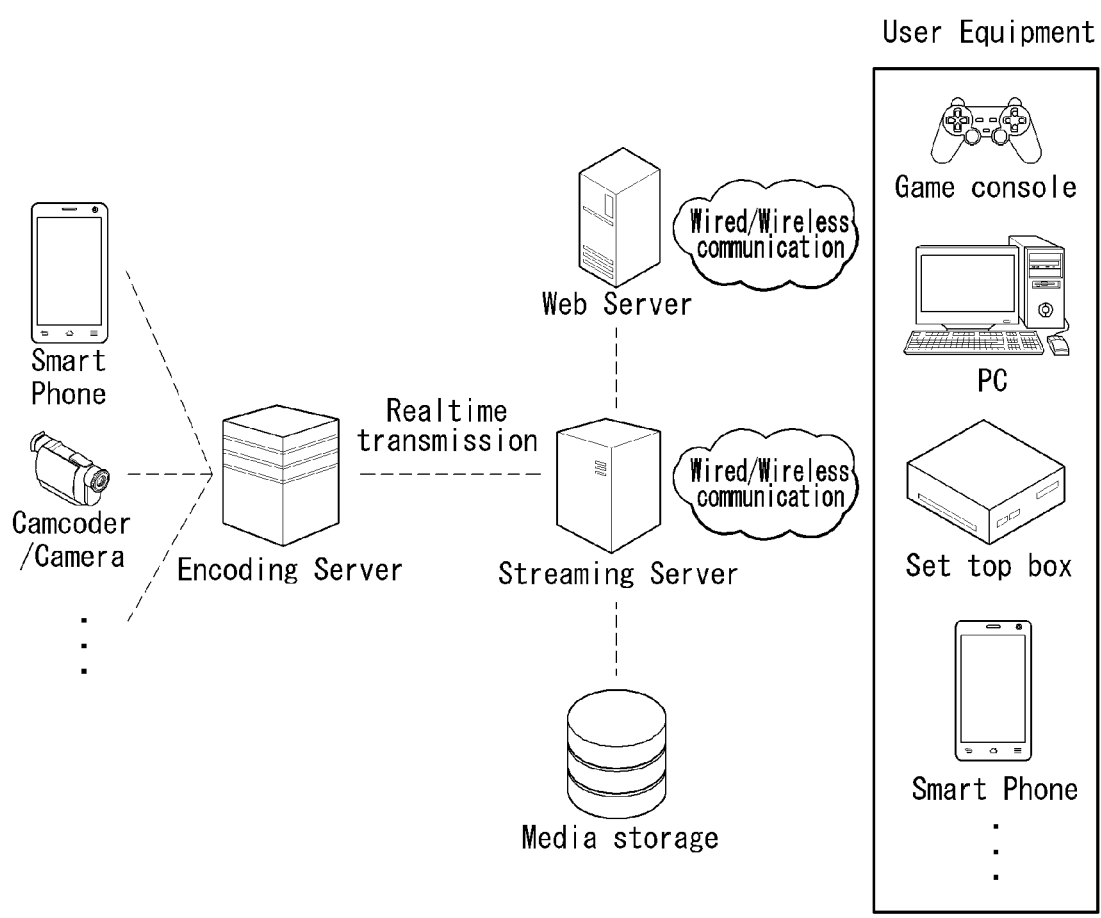

PARALLEL PROCESSING METHOD FOR COLOR COMPONENT OF VIDEO SIGNAL, AND DEVICE THEREFOR

Cross-Reference To Related Applications

This application is the National Stage filing under 35 U.S.C. 371 of International Application No. PCT/KR2019/003802, filed on Apr. 1, 2019, which claims the benefit of U.S. Provisional Application No. 62/651,224, filed on Apr. 1, 2018, the contents of which are all hereby incorporated by reference herein in their entirety.

TECHNICAL FIELD

The present disclosure relates to a method for processing still images and video and, more particularly, to a method for parallel processing of color components of a video signal and an apparatus therefor.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

One aspect of the present disclosure is to propose a method for performing coding on each component for parallel processing of color components (i.e., chroma components).

Another aspect of the present disclosure is to propose an indicator syntax for parallel processing of color components (i.e., chroma components).

Another aspect of the present disclosure is to propose an entropy initialization method for components.

Another aspect of the present disclosure is to propose a component data extraction process and collection process.

Another aspect of the present disclosure is to propose a constrained reference level and parallel decoding method for components.

Technical objects to be achieved by the present disclosure are not limited to the aforementioned technical objects, and other technical objects not described above may be evidently understood by a person having ordinary skill in the art to which the present disclosure pertains from the following description.

Technical Solution

An embodiment of the present disclosure provides a method for decoding images based on an intra prediction mode, the method comprising: parsing a syntax element indicating whether a CCLM (cross-component linear model) intra prediction on a current chroma block is disabled or not; deriving an intra prediction mode applied to the current chroma block; and generating a prediction sample for the current chroma block based on the intra prediction mode, wherein, when the CCLM intra prediction is disabled, the intra prediction mode is derived in a predetermined first prediction mode set, when the CCLM intra prediction is not disabled, the intra prediction mode is derived in a predetermined second prediction mode set, and the second prediction mode set includes intra prediction modes included in the first prediction mode set and the CCLM intra prediction mode.

Preferably, when the intra prediction mode is the CCLM intra prediction mode, the generating of a prediction sample may comprise: deriving a parameter used for the CCLM intra prediction by using a neighboring sample of a luma block corresponding to the current chroma block and a neighboring sample of the current chroma block; and generating a prediction sample for the current chroma block by using the parameter and a reconstructed sample of the luma block.

Preferably, the syntax element indicating whether the intra prediction is disabled or not may be transmitted from an encoder in a unit of a picture, a slice, a tile, or a tile group.

Preferably, when the CCLM intra prediction is disabled, the current chroma block may be decoded with reference to data of a previously parsed luma block.

Preferably, when the CCLM intra prediction is disabled, the current chroma block may be decoded with reference to a residual signal of a previously parsed luma block and an intra prediction mode for the previously parsed luma block.

Another embodiment of the present disclosure provides an apparatus for decoding images based on an intra prediction mode, the method comprising: a syntax element parser for parsing a syntax element indicating whether a CCLM (cross-component linear model) intra prediction on a current chroma block is disabled or not; an intra prediction mode deriver for deriving an intra prediction mode applied to the current chroma block; and a prediction sample generator for generating a prediction sample for the current chroma block based on the intra prediction mode, wherein, when the CCLM intra prediction is disabled, the intra prediction mode is derived in a predetermined first prediction mode set, when the CCLM intra prediction is not disabled, the intra prediction mode is derived in a predetermined second prediction mode set, and the second prediction mode set includes intra prediction modes included in the first prediction mode set and the CCLM intra prediction mode.

Preferably, when the intra prediction mode is the CCLM intra prediction mode, the prediction sample generator may derive a parameter used for the CCLM intra prediction by using a neighboring sample of a luma block corresponding to the current chroma block and a neighboring sample of the current chroma block, and generates a prediction sample for the current chroma block by using the parameter and a reconstructed sample of the luma block.

Preferably, the syntax element indicating whether the intra prediction is disabled or not may be transmitted from an encoder in a unit of a picture, a slice, a tile, or a tile group.

Preferably, when the CCLM intra prediction is disabled, the current chroma block may be decoded with reference to data of a previously parsed luma block.

Preferably, when the CCLM intra prediction is disabled, the current chroma block is decoded with reference to a residual signal of a previously parsed luma block and an intra prediction mode for the previously parsed luma block.

Advantageous Effects

In accordance with an embodiment of the present disclosure, entry to data of each component in a bitstream can be achieved, and parallel processing of each component can be ensured. That is, parallel performance can be enhanced through entry point signaling.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a schematic block diagram of an encoding apparatus which encodes a video/image signal as an embodiment to which the present disclosure is applied.

FIG. 2 is a schematic block diagram of a decoding apparatus for decoding a video/image signal as an embodiment to which the disclosure is applied.

FIG. 3 is a diagram illustrating an example of a multi-type tree structure as an embodiment to which the present disclosure may be applied.

FIG. 4 is a diagram illustrating a signaling mechanism of partition split information of a quadtree with nested multi-type tree structure as an embodiment to which the present disclosure may be applied.

FIG. 5 is a diagram illustrating a method of partitioning a CTU into multiple CUs based on a quadtree and nested multi-type tree structure as an embodiment to which the present disclosure may be applied.

FIG. 6 is a diagram illustrating a method for limiting a ternary-tree split as an embodiment to which the present disclosure may be applied.

FIG. 7 is a diagram illustrating redundant split patterns that may be generated in binary-tree split and ternary-tree split as an embodiment to which the present disclosure may be applied.

FIG. 8 and FIG. 9 are diagrams illustrating an intra prediction-based video/image encoding method according to an embodiment of the present disclosure and an intra predictor within an encoding apparatus according to an embodiment of the present disclosure.

FIG. 10 and FIG. 11 are diagrams illustrating an intra prediction-based video/image decoding method according to an embodiment of the present disclosure and an intra predictor within a decoding apparatus according to an embodiment of the present disclosure.

FIG. 12 and FIG. 13 are diagrams illustrating prediction directions of intra prediction modes according to an embodiment to which the present disclosure may be applied.

FIG. 14 is a diagram illustrating the position of a luma block for using an intra prediction mode according to an embodiment to which the present disclosure may be applied.

FIG. 15 is a diagram for explaining a CCLM (cross-component linear model) mode according to an embodiment to which the present disclosure may be applied.

FIG. 16 and FIG. 17 are diagrams illustrating a composition of bitstream data according to an embodiment to which the present disclosure may be applied.

FIG. 18 and FIG. 19 are diagrams illustrating a composition of bitstream data and entry points of each component according to an embodiment to which the present disclosure may be applied.

FIG. 20 and FIG. 21 are diagrams illustrating a method of CABAC (Context-adaptive binary arithmetic coding) initialization by setting CABAC initialization points according to an embodiment to which the present disclosure may be applied.

FIG. 22 and FIG. 23 are diagrams illustrating a component data collection method and a CABAC (Context-adaptive binary arithmetic coding) initialization point setting method according to an embodiment to which the present disclosure may be applied.

FIG. 24 is a diagram for explaining a method for constraining cross-component referencing according to an embodiment to which the present disclosure may be applied.

FIG. 25 is a flowchart illustrating a method for generating an intra prediction block according to an embodiment to which the present disclosure may be applied.

FIG. 26 is a diagram illustrating an intra prediction apparatus according to an embodiment to which the present disclosure may be applied.

FIG. 27 illustrates a video coding system to which the present disclosure is applied.

FIG. 28 is a configuration diagram of a content streaming system as an embodiment to which the present disclosure is applied.

MODE FOR DISCLOSURE

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Hereinafter, for convenience of description, the processing unit may be referred to as a 'processing block' or a 'block'.

Further, the processing unit may be interpreted into the meaning including a unit for a luma component and a unit for a chroma component. For example, the processing unit may correspond to a coding tree unit (CTU), a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a prediction unit PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

FIG. 1 is a schematic block diagram of an encoding apparatus which encodes a video/image signal as an embodiment to which the present disclosure is applied.

Referring to FIG. 1, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may include a decoded picture buffer (DPB), and may be implemented by a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion vector prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the memory 170, more particularly in the DPB of the memory 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the memory 170 may be used as a reference picture in the inter predictor 180. The encoding apparatus can avoid a prediction mismatch in the encoding apparatus 100 and a decoding apparatus and improve encoding efficiency if inter prediction is applied.

The DPB of the memory 170 may store the modified reconstructed picture to use it as a reference picture in the inter predictor 180. The memory 170 may store motion information of a block in which the motion information in the current picture is derived (or encoded) and/or motion information of blocks in an already reconstructed picture. The stored motion information may be forwarded to the inter predictor 180 to be utilized as motion information of a spatial neighboring block or motion information of a temporal neighboring block. The memory 170 may store reconstructed samples of the reconstructed blocks in the current picture and forward it to the intra predictor 185.

FIG. 2 is an embodiment to which the disclosure is applied, and is a schematic block diagram of a decoding apparatus for decoding a video/image signal.

Referring to FIG. 2, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 250 may include a decoded picture buffer (DPB), and may be implemented by a digital storage medium.

When a bitstream including video/image information is input, the decoding apparatus 200 may reconstruct an image in accordance with a process of processing video/image information in the encoding apparatus of FIG. 1. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the memory 250, more particularly to the DPB of the memory 250. The various filtering methods may include deblocking filtering, a sample adaptive offset SAO, an adaptive loop filter ALF, and a bilateral filter, for example.

The (modified) reconstructed picture stored in the DPB of the memory 250 may be used as a reference picture in the inter predictor 260. The memory 250 may store motion information of a block in which the motion information in the current picture is derived (or decoded) and/or motion information of blocks in an already reconstructed picture. The stored motion information may be forwarded to the inter predictor 260 to be utilized as motion information of a spatial neighboring block or motion information of a temporal neighboring block. The memory 170 may store reconstructed samples of the reconstructed blocks in the current picture and forward it to the intra predictor 265.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

Block Partitioning

The video/image coding method according to the present disclosure may be performed based on various detailed techniques, and each of the various detailed techniques is described as below. It is apparent to those skilled in the art that the techniques described herein may be associated with the related procedure such as a prediction, a residual process ((inverse) transform, (de)quantization, etc.), a syntax element coding, a filtering, a partitioning/splitting in a video/image encoding/decoding procedure described above and/or described below.

The block partitioning procedure according to the present disclosure may be performed in the image divider 110 of the encoding apparatus described above, and the partitioning related information may be (encoding) processed in the entropy encoder 190 and forwarded to the decoding apparatus in a bitstream format. The entropy decoder 210 of the decoding apparatus may obtain a block partitioning structure of a current picture based on the partitioning related information obtained from the bitstream, and based on it, may perform a series of procedure (e.g., prediction, residual processing, block reconstruction, in-loop filtering, etc.) for an image decoding.

Partitioning of Picture into CTUs

Pictures may be divided into a sequence of coding tree units (CTUs). A CTU may correspond to a coding tree block (CTB). Alternatively, a CTU may include a coding tree block of luma samples and two coding tree blocks of corresponding chroma samples. In other words, for a picture including three types of sample arrays, a CTU may include a N×N block of luma samples and two corresponding samples of chroma samples.

A maximum supported size of a CTU for coding and prediction may be different from a maximum supported size of a CTU for transform. For example, a maximum supported size of luma block in a CTU may be 128×128.

Partitioning of the CTUs Using a Tree Structure

A CTU may be divided into CUs based on a quad-tree (QT) structure. The quad-tree structure may be called as a quaternary structure. This is for reflecting various local characteristics. Meanwhile, in the present disclosure, a CTU may be divided based on a multi-type tree structure partitioning including a binary-tree (BT) and a ternary-tree (TT) as well as the quad-tree. Hereinafter, QTBT structure may include the quad-tree and binary-tree structures, and QTBTTT may include partitioning structures based on the binary-tree and ternary-tree. Alternatively, the QTBT structure may also include partitioning structures based on the quad-tree, binary-tree and ternary-tree. In the coding tree structure, a CU may have a square or rectangle shape. A CTU may be divided into a quad-tree structure, first. And then, leaf nodes of the quad-tree structure may be additionally divided by the multi-type tree structure.

FIG. 3 is a diagram illustrating an example of a multi-type tree structure as an embodiment to which the present disclosure may be applied.

In an embodiment of the present disclosure, a multi-type tree structure may include 4 split types as shown in FIG. 3. The 4 split types may include a vertical binary splitting (SPLIT_BT_VER), a horizontal binary splitting (SPLIT_BT_HOR), a vertical ternary splitting (SPLIT_TT_VER) and a horizontal ternary splitting (SPLIT_TT_HOR). The leaf nodes of the multi-type tree structure may be called as CUs. Such CUs may be used for prediction and transform procedure. In the present disclosure, generally, a CU, a PU and a TU may have the same block size. However, in the case that a maximum supported transform length is smaller than a width or a height of a color component, a CU and a TU may have different block sizes.

FIG. 4 is a diagram illustrating a signaling mechanism of partition split information of a quadtree with nested multi-type tree structure as an embodiment to which the present disclosure may be applied.

Here, a CTU may be treated as a root of a quad-tree and initially partitioned into a quad-tree structure. Each quad-tree leaf node may be further partitioned into a multi-type tree structure later. In the multi-type tree structure, a first flag (e.g., mtt_split_cu_flag) is signaled to indicate whether the corresponding node is further partitioned). In the case that the corresponding node is further partitioned, a second flag (e.g., mtt_split_cu_verticla_flag) may be signaled to indicate a splitting direction. Later, a third flag (e.g., mtt_split_cu_binary_flag) may be signaled to indicate whether the split type is a binary split or a ternary split. For example, based on the mtt_split_cu_vertical_flag and the mtt_split_cu_binary_flag, a multi-type tree splitting mode (MttSplitMode) may be derived as represented in Table 1 below.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 5 is a diagram illustrating a method of partitioning a CTU into multiple CUs based on a quadtree and nested multi-type tree structure as an embodiment to which the present disclosure may be applied.

Here, bolded block edges represent a quad-tree partitioning, and the remaining edges represent a multi-type tree partitioning. The quad-tree partition with nested multi-type tree may provide a contents-adapted coding tree structure. A CU may correspond to a coding block (CB). Or, a CU may include a coding block of luma samples and two coding blocks of corresponding chroma samples. A size of CU may be great as much as a CTU or may be small as 4×4 in a luma sample unit. For example, in the case of 4:2:0 color format (or chroma format), a maximum chroma CB size may be 64×64, and a minimum chroma CB size may be 2×2.

In the present disclosure, for example, a maximum supported luma TB size may be 64×64, and a maximum supported chroma TB size may be 32×32. In the case that a width or a height of a CB partitioned according to the tree structure is greater than a maximum transform width or height, the CB may be further partitioned until a TB size limit in horizontal and vertical directions are satisfied automatically (or implicitly).

Meanwhile, for the quad-tree coding tree scheme with nested multi-type free, the following parameters may be defined or recognized as SPS syntax element.

CTU size: the root node size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type tree splitting from a quadtree leaf
MinBtSize: the minimum allowed binary tree leaf node size
MinTtSize: the minimum allowed ternary tree leaf node size As an example of the quad-tree coding tree scheme with nested multi-type tree, a CTU size may be set to 128×128 luma samples and 64×64 blocks of two corresponding chroma samples (in 4:2:0 chroma sample). In this case, MinOTSize may be set to 16×16, MaxBtSize may be set to 128×128, MaxTtSzie may be set to 64×64, MinBtSize and MinTtSize (for both width and height) may be set to 4×4, and MaxMttDepth may be set to 4. The quad-tree partitioning may be applied to a CTU and generate quad-tree leaf nodes. The quad-tree leaf node may be called a leaf QT node. The quad-tree leaf nodes may have a size from 16×16 size (i.e. the MinOTSize) to 128×128 size (i.e. the CTU size). In the case that a leaf QT node is 128×128, the leaf QT node may not be partitioned into a binary-tree/ternary-tree. This is because the leaf QT node exceeds MaxBtsize and MaxTtszie (i.e., 64×64) even in the case the leaf QT node is partitioned. In other case, the leaf QT node may be additionally partitioned into a multi-type tree. Therefore, the leaf QT node may be a root node for the multi-type tree, and the leaf QT node may have multi-type tree depth (mttDepth) 0 value. In the case that the multi-type tree depth reaches MaxMttdepth (e.g., 4), no more additional partition may be considered. In the case that a width of the multi-type tree node is equal to MinBtSize and smaller than or equal to 2×MinTtSize, no more additional horizontal partitioning may be considered. In the case that a height of the multi-type tree node is equal to MinBtSize and smaller than or equal to 2×MinTtSize, no more additional vertical partitioning may be considered.

FIG. 6 is a diagram illustrating a method for limiting a ternary-tree split as an embodiment to which the present disclosure may be applied.

Referring to FIG. 6, in order to support 64×64 luma block and 32×32 chroma pipeline design in a hardware decoder, a TT split may be limited in a specific case. For example, in the case that a width or a height of a luma coding block is greater than a predetermined specific value (e.g., 32, 64), as shown in FIG. 6, a TT split may be limited.

In the present disclosure, the coding tree scheme may support that a luma and chroma block have a separate block tree structure. With respect to P and B slices, luma and chroma CTBs in a single CTU may be limited to have the same coding tree structure. However, with respect to I slices, luma and chroma blocks may have respective individual block tree structures. In the case that the individual block tree mode is applied, a luma CTB may be partitioned into CUs based on a specific coding tree structure, and a chroma CTB may be partitioned into chroma CUs based on a different coding tree structure. This may mean that a CU in I slice may include a coding block of chroma component or coding blocks of two chroma component, and a CU in P or B slice may include blocks of three color components.

In the "Partitioning of the CTUs using a tree structure" described above, the quad-tree coding tree scheme with nested multi-type tree is described, but a structure in which a CU is partitioned is not limited thereto. For example, BT structure and TT structure may be interpreted as the concept included in the Multiple Partitioning Tree (MPT) structure, and it may be interpreted that a CU is partitioned through QT structure and MPT structure. In an example that a CU is partitioned through QT structure and MPT structure, a syntax element including information on the number of blocks to which a leaf node of QT structure is partitioned (e.g., MPT_split_type) and a syntax element including information a direction to which a leaf node of QT structure is partitioned between vertical and horizontal directions (e.g., MPT_split_mode) may be signaled, and a split structure may be determined.

In another example, a CU may be partitioned in a method different from QT structure, BT structure or TT structure. That is, different from that a CU of a lower layer depth is partitioned to ¼ size of a CU of a higher layer depth according to QT structure, a CU of a lower layer depth is partitioned to ½ size of a CU of a higher layer depth according to BT structure, or a CU of a lower layer depth is partitioned to ¼ size or ½ size of a CU of a higher layer depth according to TT structure, a CU of a lower layer depth may be partitioned into ⅕, ⅓, ⅜, ⅗, ⅔ or ⅝ size of a CU of a higher layer depth in some cases, but a method of partitioning a CU is not limited thereto.

In the case that a portion of a tree node block exceeds a bottom or right picture boundary, the corresponding tree node block may be limited that all samples of all coded CUs are located within the picture boundaries. In this case, for example, the following split rules may be applied.

If a portion of a tree node block exceeds both the bottom and the right picture boundaries,
If the block is a QT node and the size of the block is larger than the minimum QT size, the block is forced to be split with QT split mode.
Otherwise, the block is forced to be split with SPLIT_BT_HOR mode
Otherwise if a portion of a tree node block exceeds the bottom picture boundaries,
If the block is a QT node, and the size of the block is larger than the minimum QT size, and the size of the block is larger than the maximum BT size, the block is forced to be split with QT split mode.
Otherwise, if the block is a QT node, and the size of the block is larger than the minimum QT size and the size of the block is smaller than or equal to the maximum BT size, the block is forced to be split with QT split mode or SPLIT_BT_HOR mode.

Otherwise (the block is a BTT node or the size of the block is smaller than or equal to the minimum QT size), the block is forced to be split with SPLIT_BT_HOR mode.

Otherwise if a portion of a tree node block exceeds the right picture boundaries, If the block is a QT node, and the size of the block is larger than the minimum QT size, and the size of the block is larger than the maximum BT size, the block is forced to be split with QT split mode.

Otherwise, if the block is a QT node, and the size of the block is larger than the minimum QT size and the size of the block is smaller than or equal to the maximum BT size, the block is forced to be split with QT split mode or SPLIT_BT_VER mode.

Otherwise (the block is a BTT node or the size of the block is smaller than or equal to the minimum QT size), the block is forced to be split with SPLIT_BT_VER mode.

Meanwhile, the quad-tree coding tree scheme with nested multi-type tree described above may provide very flexible partitioning structure. Owing to the split types supported in the multi-type tree, different split patterns may bring a result of the same coding block structure in some cases. By limiting generations of such redundant split patterns, a data amount of partitioning information may be reduced. This is described with reference to the following drawing.

FIG. 7 is a diagram illustrating redundant split patterns that may be generated in binary-tree split and ternary-tree split as an embodiment to which the present disclosure may be applied.

As shown in FIG. 7, two levels of consecutive binary splits in one direction may have the same coding block structure as the binary split for a center partition after a ternary split. In this case, the binary-tree split for the center partition of the ternary-tree split may be limited (in the given direction). Such a limit may be applied to CUs of all pictures. In the case that such a specific split is limited, signaling of the corresponding syntax elements may be modified by reflecting the limited case, and through this, the number of bits signaled for partitioning may be reduced. For example, as exemplified in FIG. 7, in the case that the binary-tree split for the center partition of a CU is limited, mtt_split_cu_binary_flag syntax element that indicates whether a split is the binary split or the ternary split may not be signaled, and the value may be inferred by a decoder as 0.

Prediction

In order to reconstruct a current processing unit on which decoding is performed, a decoded part of a current picture or other pictures including the current processing unit may be used.

A picture (slice) that uses only the current picture for reconstruction, that is, performs only an intra prediction, may be referred to as an intra picture or an I picture (slice), a picture (slice) that uses maximum one motion vector and a reference index to predict each unit may be referred to as a predictive picture or a P picture (slice), and a picture (slice) that uses maximum two motion vectors and two reference indices may be referred to as a Bi-predictive picture or a B picture (slice).

The intra prediction refers to a prediction method of deriving a current processing block from data elements (e.g. sample values, etc.) of the same decoded picture (or slice). That is, it refers to a method of predicting a pixel value of the current processing block by referring to reconstructed areas in the current picture.

Hereinafter, an inter prediction will be described in more detail.

Intra Prediction (or Intra-Screen Prediction)

Intra prediction means a prediction method for deriving a current processing block from data elements (e.g., sample value) of the same decoded picture (or slice). That is, intra prediction means a method of predicting a pixel value of a current processing block with reference to reconstructed regions within a current picture.

Intra prediction may represent a prediction that generates prediction samples for a current block based on reference samples outside the current block within the picture (hereinafter, current picture) to which the current block belongs.

The present disclosure describes a detailed technology of the intra prediction method explained earlier with reference to FIGS. 1 and 2, where the decoder may be represented by the intra prediction-based video/image decoding method of FIG. 10 and the intra predictor within the decoding apparatus of FIG. 11 which will be described later. Also, the encoder may be represented by the intra prediction-based video/image encoding method of FIG. 8 and the intra predictor within the encoding apparatus of FIG. 9 which will be described later. In addition, data encoded as shown in FIGS. 8 and 9 may be stored in the form of a bitstream.

If an intra prediction is applied to a current block, neighboring reference samples used for intra prediction on the current block may be derived. The neighboring reference samples of the current block with a size of nW×nH may comprise a total of 2×nH samples including samples adjacent to the left boundary of the current block and samples neighboring the bottom-left of the current block, a total of 2×nW samples including samples adjacent to the top boundary of the current block and samples neighboring the top-right of the current block, and one sample neighboring the top-left of the current block. Alternatively, the neighboring reference samples of the current block may comprise a plurality of rows of upper neighboring samples and a plurality of columns of left neighboring samples. Also, the neighboring reference samples of the current block with a size of nw×nH may comprise a total of nh samples adjacent to the right boundary of the current block, a total of nw samples adjacent to the bottom boundary of the current block, and one sample neighboring the bottom-right of the current block.

It should be noted that some of the neighboring reference samples of the current block may not have been decoded yet or not available. In this case, the decoder may substitute unavailable samples with available samples to construct neighboring reference samples used for prediction. Alternatively, the neighboring reference samples for use in prediction may be constructed by the interpolation of the available samples.

Once the neighboring reference samples are derived, (i) a prediction sample may be derived based on the average or interpolation of the neighboring reference samples of the current block, or (ii) the prediction sample may be derived based on a reference sample present in a particular (prediction) direction with respect to the prediction sample, among the neighboring reference samples of the current block. (i) may be called a non-directional mode or non-angular mode, and (ii) may be called a directional mode or angular mode. Moreover, the prediction sample may be generated by the interpolation of the second neighboring sample and first neighboring sample, among the neighboring reference samples, located in the direction opposite to the prediction direction of the intra prediction mode of the current block with respect to the prediction sample of the current block.

The above case may be called linear interpolation intra prediction (LIP). Also, the prediction sample of the current block may be derived by deriving a temporary prediction sample of the current block based on filtered neighboring reference samples and calculating the weighted sum of at least one reference sample derived according to the intra prediction mode, among the existing neighboring reference samples, i.e., unfiltered neighboring reference samples, and the temporary prediction sample. The above case may be called position dependent intra prediction (PDPC). Meanwhile, post-filtering of the derived prediction sample may be performed if necessary.

Specifically, an intra prediction procedure may comprise an intra prediction mode determination step, a neighboring reference sample derivation step, and an intra prediction mode-based prediction sample derivation step. Also, post-filtering of the derived prediction sample may be performed if necessary.

The intra prediction-based video/image encoding procedure and the intra predictor within the encoding apparatus will be schematically described below by way of example.

FIG. 8 and FIG. 9 are diagrams illustrating an intra prediction-based video/image encoding method according to an embodiment of the present disclosure and an intra predictor within an encoding apparatus according to an embodiment of the present disclosure.

Referring to FIGS. 8 and 9, S801 may be performed by the intra predictor 185 of the encoding apparatus, and S802 may be performed by the residual processor of the encoding apparatus. Specifically, S802 may be performed by the subtractor 115 of the encoding apparatus. In S803, predicted information may be derived by the intra predictor 185 and encoded by the entropy encoder 190. In S803, residual information may be derived by the residual processor and encoded by the entropy encoder 190. The residual information is information about the residual samples. The residual information may comprise information about quantized transform coefficients for the residual samples.

As described above, the residual samples may be derived as transform coefficients through the transformer 120 of the encoding apparatus, and the transform coefficients may be derived as quantized transform coefficients through the quantizer 130. Information about the quantized transform coefficients may be encoded by the entropy encoder 190 through a residual coding procedure.

The encoding apparatus may perform an intra prediction on a current block (S801). The encoding apparatus may derive an intra prediction mode for the current block, derive neighboring reference samples of the current block, and generate prediction samples within the current block based on the intra prediction mode and the neighboring reference samples. In this case, the intra prediction mode determination, neighboring reference sample derivation, and prediction sample generation procedures may be performed simultaneously, or one of the procedures may be performed prior to another procedure. For example, the intra predictor 185 of the encoding apparatus may comprise a prediction mode determiner 186, a reference sample deriver 187, and a prediction sample deriver 188. The prediction mode determiner 186 may determine an intra prediction mode for the current block. The reference sample deriver 187 may derive neighboring reference samples of the current block. The prediction sample deriver 188 may derive motion samples of the current block. Meanwhile, although not illustrated, in a case where a prediction sample filtering procedure to be described later is performed, the intra predictor 185 may further comprise a prediction sample filter unit (not illustrated). The encoding apparatus may determine a mode applied to the current block, among a plurality of intra prediction modes. The encoding apparatus may compare RD costs for the intra prediction modes, and may determine the best intra prediction mode for the current block.

Meanwhile, the encoding apparatus may perform a prediction sample filtering procedure. The prediction sample filtering may be called post filtering. Some or all of the prediction samples may be filtered by the prediction sample filtering procedure. The prediction sample filtering procedure may be omitted in some cases.

The encoding apparatus may generate residual samples for the current block based on (filtered) prediction samples (S802). The encoding apparatus may encode image information, including prediction mode information indicative of the intra prediction mode and residual information related to the residual samples (S803). The encoded image information may be outputted in the form of a bitstream. The output bitstream may be transmitted to the decoding apparatus through a storage medium or over a network.

As described above, the encoding apparatus may generate a reconstructed picture (including reconstructed samples and a reconstructed block) based on the reference samples and the residual samples. This is in order for the encoding apparatus to derive the same prediction results as the decoding apparatus, whereby the coding efficiency can be enhanced. As described above, an in-loop filtering procedure may be further applied to the reconstructed picture.

FIG. 10 and FIG. 11 are diagrams illustrating an intra prediction-based video/image decoding method according to an embodiment of the present disclosure and an intra predictor within a decoding apparatus according to an embodiment of the present disclosure.

Referring to FIGS. 10 and 11, the decoding apparatus may perform operations corresponding to the operations performed in the encoding apparatus. The decoding apparatus may perform a prediction on a current block based on received prediction information and derive prediction samples.

Specifically, the decoding apparatus may derive an intra prediction mode for a current block based on received prediction mode information (S1001). The decoding apparatus may derive neighboring reference samples of the current block (S1002). The decoding apparatus may generate prediction samples within the current block based on the intra prediction mode and the neighboring reference samples (S1003). In this case, the decoding apparatus may perform a prediction sample filtering procedure. The prediction sample filtering may be called post filtering. Some or all of the prediction samples may be filtered by the prediction sample filtering procedure. The prediction sample filtering procedure may be omitted in some cases.

The decoding apparatus may generate residual samples for the current block based on received residual information (S1004). The decoding apparatus may generate reconstructed samples for the current block based on the (filtered) prediction samples and the residual samples, and may generate a reconstructed picture based on the reconstructed samples (S1005).

Here, the intra predictor 265 of the decoding apparatus may comprise a prediction mode determiner 266, a reference sample deriver 267, and a prediction sample deriver 268. The prediction mode determiner 266 may determine an intra prediction mode for the current block based on prediction mode information received from the prediction mode determiner 186 of the encoding apparatus. The reference sample deriver 266 may derive neighboring reference samples of the current block. The prediction sample deriver 268 may derive prediction samples of the current block. Meanwhile, although not illustrated, in a case where the above-mentioned prediction sample filtering procedure is performed, the intra predictor 265 may further comprise a prediction sample filter unit (not illustrated).

The prediction mode information may comprise flag information (ex. prev_intra_luma_pred_flag) indicating whether a most probable mode (MPM) or a remaining mode is applied to the current block. In a case where the MPM is applied to the current block, the prediction mode information may further comprise index information (ex. mpm_idx) indicative of one of the intra prediction mode candidates (MPM candidates). In this case, the intra prediction mode candidates (MPM candidates) may be constructed into an MPM candidate list or an MPM list. Furthermore, in a case where the MPM is not applied to the current block, the prediction mode information may further comprise remaining mode information (ex. rem_inra_luma_pred_mode) indicative of one of the remaining intra prediction modes, not the intra prediction mode candidates (MPM candidates). The decoding apparatus may determine an intra prediction mode for the current block based on the prediction mode information. The prediction mode information may be encoded/decoded through a coding method to be described later. For example, the prediction mode information may be encoded/decoded through entropy coding (ex. CABAC, CAVLC) based on a truncated (rice) binary code.

Determination of Intra Prediction Mode

If an intra prediction is applied, an intra prediction mode applied to a current block may be determined using an intra prediction mode of a neighboring block. For example, the decoding apparatus may select one of most probable mode (MPM) candidates derived based on an intra prediction mode of a block to the left of the current block and an intra prediction mode of a block above the current block, based on a received mpm index, or may select one of the remaining intra prediction modes not included in the mpm candidates, based on remaining intra prediction mode information. The mpm index may be signaled in the form of an mpm_idx syntax element. The remaining intra prediction mode information may be signaled in the form of a rem_intra_luma_pred_mode syntax element. For example, the remaining intra prediction mode information may indicate one of the remaining intra prediction modes not included in the mpm candidates, among all of the intra prediction modes, which are indexed in the order of prediction mode numbers.

FIG. 12 and FIG. 13 are diagrams illustrating prediction directions of intra prediction modes according to an embodiment to which the present disclosure may be applied.

Referring to FIG. 12, the intra prediction modes may include 2 non-directional prediction modes and 33 directional prediction modes. The non-directional prediction modes may include a planar intra prediction mode and a DC intra prediction mode. The directional prediction modes may include intra prediction modes #2 to #34. The planar intra prediction mode may be called a planar mode, and the DC intra prediction mode may be called a DC mode.

Meanwhile, in order to capture a given edge direction proposed in natural video, the directional intra prediction modes may be extended from the existing 33 modes to 65 modes as illustrated in FIG. 13 to be described later. In this case, the intra prediction modes may include 2 non-directional intra prediction modes and 65 directional intra prediction modes. The non-directional intra prediction modes may include a planar intra prediction mode and a DC intra prediction mode. The directional intra prediction modes may include intra prediction modes #2 to #66. The extended number of directional intra prediction modes may be applied to blocks of all sizes, and may be applied to both a luma component and a chroma component.

Alternatively, the intra prediction modes may include 2 non-directional prediction modes and 129 directional prediction modes. The non-directional prediction modes may include a planar intra prediction mode and a DC intra prediction mode. The directional prediction modes may include intra prediction modes #2 to #130.

The predictor of the encoding apparatus/decoding apparatus may derive a reference sample according to an intra prediction mode of a current block, among neighboring reference samples of the current block, and may generate a prediction sample of the current block based on the reference sample.

For example, (i) a prediction sample may be derived based on the average or interpolation of the neighboring reference samples of the current block, or (ii) the prediction sample may be derived based on a reference sample present in a particular (prediction) direction with respect to the prediction sample, among the neighboring reference samples of the current block. (i) may be called a non-directional mode or non-angular mode, and (ii) may be called a directional mode or angular mode. Also, in one embodiment, multiple reference sample lines may be used for more precise prediction, which use one or more reference sample lines for more accurate intra prediction.

Derivation of Prediction Sample for Chroma Component

If an intra prediction is performed on a current block, a prediction on a luma component block (luma block) of the current block and a prediction on a chroma component block (chroma block) may be performed. In this case, an intra prediction mode for the chroma component (chroma block) may be set separately from an intra prediction mode for the luma component (luma block).

For example, the intra prediction mode for the chroma component may be indicated based on intra chroma prediction mode information, and the intra chroma prediction mode information may be signaled in the form of an intra_chroma_pred_mode syntax element. In an example, the intra chroma prediction mode information may indicate one among a planar mode, a DC mode, a vertical mode, a horizontal mode, a DM (Derived Mode), and a LM (Linear Mode). Herein, the planar mode may represent intra prediction mode #0, the DC mode may represent intra prediction mode #1, the vertical mode may represent intra prediction mode #50, and the horizontal mode may represent intra-prediction mode #18.

On the other hand, DM and LM are dependent intra prediction modes for predicting a chroma block using information of a luma block. The DM may indicate a mode in which the same intra prediction mode as the intra prediction mode for the luma component is applied as the intra prediction mode for the chroma component. The LM may indicate an intra prediction mode in which reconstructed samples of the luma block are sub-sampled in the process of generating a prediction block for the chroma block and then LM parameters $\alpha$ and $\beta$ are applied to the sub-sampled samples to derive samples and use them as prediction samples for the chroma block.

Multiple DM (Direct Mode)

In one embodiment of the present disclosure, Multiple DM (MDM) may be applied to a chroma block by extending the DM mode, which is an existing single mode, to multiple modes.

FIG. 14 is a diagram illustrating the position of a luma block for using an intra prediction mode according to an embodiment to which the present disclosure may be applied.

The encoder/decoder may use an intra prediction mode of a luma block and/or neighboring chroma block positioned as illustrated in FIG. 14, in order to derive an intra prediction mode for the chroma block. In this case, the encoder/decoder may use intra prediction modes of blocks positioned as illustrated in FIG. 14 as multiple DM modes.

For example, a preset number of prediction modes, among the following prediction modes, may be configured as MDM modes (or MDM candidates, an MDM candidate list). In an example, the MDM modes may include 5 intra prediction modes.

- Intra prediction modes for CR, TL, TR, BL, and BR positions (or position blocks) of a luma block in the same position (or a luma block corresponding to a current chroma block)
- Intra prediction modes for L, A, BL, AR, and AL blocks which are neighboring blocks of the current chroma block
- Planar mode, DC mode
- Direction (angular) modes which are obtained by adding −1 or +1 to previously selected angular modes
- Vertical mode, horizontal mode, and modes #2, #34, #66, #10 and #26 (in the case of 65 directional modes)
- If 5 prediction modes are not selected, copy and select the previously selected modes
- CCLM (Cross-Component Linear Model) Mode In one embodiment of the present disclosure, a CCLM mode may be applied to a current chroma block, which is a prediction mode using the correlation between a luma block and a chroma block corresponding to the luma block.

When the CCLM mode is applied, the encoder/decoder may derive a linear model based on neighboring samples of the luma block and neighboring samples of the chroma block, and derive a prediction sample for the chroma block based on the linear model and reconstructed samples of the luma block.

Specifically, when the CCLM mode is applied to the current chroma block, the encoder/decoder may derive parameters for a linear model based on neighboring samples used for intra prediction on the current chroma block and neighboring samples used for intra prediction on the current luma block (or corresponding luma block). For example, the linear model may be represented by the following Equation 1:

$$pred_c(i,j) = \alpha \cdot rec_L'(i,j) + \beta \quad \text{[Equation 1]}$$

where $pred_c(i,j)$ may represent a prediction sample on the coordinates (i,j) of the current chroma block, and $rec_L'(i,j)$ may represent a reconstructed sample on the coordinates (i,j) of the current luma block. Also, $rec_L'(i,j)$ may represent a down-sampled reconstructed sample of the current luma block.

Meanwhile, the parameter α and parameter β of the linear model may be derived based on the neighboring samples of the current luma block and the neighboring samples of the current chroma block. The parameter α and parameter β may be derived by using the following Equations 2 and 3:

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)} \quad \text{[Equation 2]}$$

$$\beta = \frac{\sum C(n) - \alpha \cdot \sum L(n)}{N} \quad \text{[Equation 3]}$$

where L(n) may represent upper neighboring samples and left neighboring samples of the current luma block, and C(n) may represent upper neighboring samples and left neighboring samples of the current chroma block. Also, the L(n) may represent down-sampled upper neighboring samples and left neighboring samples of the current luma block. Also, N may represent a value twice as much as the lower value between the width and height of the current chroma block.

FIG. 15 is a diagram for explaining a CCLM (cross-component linear model) mode according to an embodiment to which the present disclosure is applied.

As described previously, the encoder/decoder may use the above-explained Equation 2 and Equation 3 in order to derive the parameter α and parameter β. In this instance, the positions of the neighboring samples used in Equation 2 and Equation 3 are as illustrated in FIG. 15.

Meanwhile, a total of 6 intra prediction modes may be allowed for chroma intra mode coding in order to code a chroma intra prediction mode. The 6 intra prediction modes may include 5 existing intra prediction modes and one CCLM mode (cross-component linear model mode). Table 2 below shows chroma intra prediction mode information and a derivation process.

TABLE 2

| Chroma prediction mode | Corresponding luma intra prediction mode | | | | |
|---|---|---|---|---|---|
| | 0 | 50 | 18 | 1 | x (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 77 | 77 | 77 | 77 | 77 |
| 5 | 0 | 50 | 18 | 1 | X |

In the present disclosure, a video coding technology for parallel processing of encoding/decoding for high-resolution images and low-latency applications is proposed. Application programs such as HDR, Screen Contents, Peer to Peer Broadcasting may be used. Image properties of such application programs include a vast amount of data on color components. Thus, in the case of high-resolution images and 4:4:4 images, higher throughput is required to decode color components.

Accordingly, one aspect of the present disclosure is to propose a method for performing coding on each component for parallel processing of color components (i.e., chroma components).

Another aspect of the present disclosure is to propose an indicator syntax for parallel processing of color components (i.e., chroma components).

Another aspect of the present disclosure is to propose an entropy initialization method for components.

Another aspect of the present disclosure is to propose a component data extraction process and collection process.

Another aspect of the present disclosure is to propose a constrained reference level and parallel decoding method for components.

FIG. 16 and FIG. 17 are diagrams illustrating a composition of bitstream data according to an embodiment to which the present disclosure may be applied.

Bitstream data may be sequentially composed of specific processing units of data of luma components and chroma components. The specific processing units may be CTUs, tiles, slices, tile groups, slice segments, pictures, and sequences.

Referring to FIG. 16, bitstream data comprising data of luma components and chroma components sequentially composed in a CTU unit is illustrated.

Referring to FIG. 17, bitstream data comprising data of luma components and chroma components sequentially composed in a specific processing unit (or specific region) is illustrated. In FIG. 17, it is assumed that data of each luma component and data of each chroma component sequentially comprise CTUs of data. In this case, the specific processing units may be CTUs, tiles, slices, tile groups, slice segments, pictures, and sequences.

For example, a bitstream for a tile may comprise data in the order of luma component—chroma Cb component—chroma Cr component. Also, the luma component data may be sequentially composed of the CTUs of luma component data included in the tile. The chroma Cb component data may be sequentially composed of the CTUs of chroma Cb component data included in the tile. The chroma Cr component data may be sequentially composed of the CTUs of chroma Cr component data included in the tile.

In a case where luma and chroma component data is grouped into units of a higher level than CTUs as illustrated in FIG. 17, this may allow for parallel processing of each component.

Moreover, in one embodiment of the present disclosure, an indicator index may be used to indicate a data composition of color components. In an embodiment, a composition of components of bitstream data may be indicated by using a syntax element of Table 3.

TABLE 3

|  | Descriptor |
| --- | --- |
| ... | |
| color_components_composition_indicator_flag | u(1) |
| ... | |

In Table 3, if color_components_composition_indicator_flag is 1, this indicates that sequential component data comprises each CTU as illustrated in FIG. 16. If color_components_composition_indicator_flag is 0, this indicates that same component data comprises CTUs in a unit of specific regions (i.e., higher-level regions than CTUs) as illustrated in FIG. 17.

FIG. 18 and FIG. 19 are diagrams illustrating a composition of bitstream data and entry points of each component according to an embodiment to which the present disclosure may be applied.

In one embodiment of the present disclosure, an offset and/or bitlength indicating the position of a component may be used for parallel processing of each component. In the bitstream structure explained above with reference to FIGS. 16 and 17, there may be various entry points for component data.

Specifically, in the bitstream structure explained above with reference to FIG. 16, the entry points illustrated in FIG. 18 may be used. Also, in the bitstream structure explained above with reference to FIG. 17, the entry points illustrated in FIG. 19 may be used. Through this, the decoder may access each component data within a bitstream and is capable of parallel processing of each component.

In a dual tree structure where a luma component and a chroma component have independent split structures, there is no data dependency among split information. In this case, parallel performance can be enhanced through entry point signaling proposed in this embodiment.

In one embodiment of the present disclosure, an offset and/or bitlength may provide direct support for the decoder's access to each component data, without parsing the syntax of all data. In an embodiment, the position of component data in a bitstream may be derived based on the syntax structure of Table 4 below.

TABLE 4

| | |
| --- | --- |
| num_components_point_offsets | ue(v) |
| if(num_entry_point_offsets > 0) { | |
|   offset_len_minus1 | ue(v) |
|   for(i = 0; i < num_components_point_offsets; i++) | |
|     component_point_offset_minus1[i] | u(v) |

In Table 4, num_components_point_offsets indicates the number of components (or the number of entry points). offset_len_minus1 indicates an offset for indicating an entry point, and component_point_offset_minus1[i] indicates an offset for indicating the entry point of an i-th component. In an example, the entry point of each component may be derived by using the following Equation 4. Also, the end point of each component may be derived by using the following Equation 5.

$$\text{startPointByte}[k] = \Sigma_{n-1}^{k}(\text{component\_point\_offset\_minus1}[n-1]+1) \quad \text{[Equation 4]}$$

$$\text{endPointByte}[k] = \text{startPointByte}[k] + \text{component\_point\_offset\_minus1}[k] \quad \text{[Equation 5]}$$

FIG. 20 and FIG. 21 are diagrams illustrating a method of CABAC (Context-adaptive binary arithmetic coding) initialization by setting CABAC initialization points according to an embodiment to which the present disclosure may be applied.

In one embodiment of the present disclosure, a CABAC (Context-adaptive binary arithmetic coding) initialization process may be applied to each component in order to improve the throughput of the entropy decoder. The CABAC initialization process according to the embodiment of the present disclosure allows for parallel processing for entropy decoding.

When CABAC initialization is used, CABAC initialization points may be set from the viewpoint of parallel decoding. In the bitstream structure explained previously with reference to FIGS. 16 and 17, various CABAC initialization points for component data may be set.

Specifically, in the bitstream structure explained previously with reference to FIG. 16, the CABAC initialization points illustrated in FIG. 20 may be used. Also, in the bitstream structure explained previously with reference to FIG. 17, the CABAC initialization points illustrated in FIG. 21 may be used. Through this, the decoder may perform CABAC initialization on each component within the bitstream, and perform parallel processing for entropy decoding on each component. In an embodiment, whether to perform CABAC initialization on the current component or not may be determined based on the syntax structure of Table 5 below.

TABLE 5

| | Descriptor |
|---|---|
| ... | |
| entropy_initialization_flag | u(1) |
| ... | |

In Table 5, if entropy_initialization_flag is 1, this indicates that the entropy decoder must be initialized, and, if entropy_initialization_flag is 0, the entropy decoder must not be initialized.

FIG. 22 and FIG. 23 are diagrams illustrating a component data collection method and a CABAC (Context-adaptive binary arithmetic coding) initialization point setting method according to an embodiment to which the present disclosure may be applied.

In one embodiment of the present disclosure, the encoder/decoder may extract data of a specific component and collect the corresponding data. Referring again to FIG. 18 explained previously, the encoder/decoder may instantly access luma component and chroma component data according to the above-proposed embodiment and parse the syntax of each component data in a parallel manner.

However, according to the foregoing embodiment, compression efficiency may be reduced due to frequent CABAC initialization processes. Accordingly, in order to improve this problem, one embodiment of the present disclosure proposes a component data collection method. The encoder/decoder may collect data of a specific component without applying a CABAC initialization process and perform entropy decoding based on accumulated probability.

In this case, the component data illustrated in FIG. 18 may be collected as illustrated in FIG. 22. Also, in a case where component data is collected as illustrated in FIG. 17, CABAC initialization points illustrated in FIG. 23 may be used. In an embodiment, whether to collect data for each component or not may be determined based on the syntax structure of Table 6 below.

TABLE 6

| | Descriptor |
|---|---|
| ... | |
| collect_component_flag | u(1) |
| ... | |

In Table 6, collect_component_flag is a flag indicating whether the component is collected or not. If the value is 1, the component data may be collected as in FIG. 22.

Moreover, in one embodiment of the present disclosure, the encoder may signal to the decoder a syntax for handling (or on/off) a process for cross-referencing between each component. For example, the process for cross-referencing between each component may include technologies (or coding tools) such as a DM (Derived Mode) for representing a dependent intra prediction mode for predicting a chroma block using information of a luma block, a CCLM (cross-component linear model) mode (or LM (linear model) mode), which is a prediction mode in which the correlation between a luma block and a chroma block corresponding to the luma block is used for the chroma block, and IC (illumination compensation) representing a method for refining inter-predicted sample values based on a linear model for changes in illumination, all of which may be collectively referred to as cross-component referencing in the present disclosure. In an example, cross-component referencing may collectively refer to DM, CCLM, LM, and IC or at least one of them.

In the case where cross-component referencing is used, the decoder has to wait for reference components to be decoded, and parallel processing may be therefore disabled. Accordingly, the encoder/decoder may disable the cross-component referencing process in order to ensure parallel performance. In an example, in order to disable the cross-component referencing process, the encoder may signal to the decoder a flag syntax (or syntax element) through a sequence parameter set syntax as in Table 7 below.

TABLE 7

| seq_parameter_set_rbsp( ) { | Descriptor |
|---|---|
|   sps_max_sub_layers_minus1 | u(3) |
|   sps_reserved_zero_5bits | u(5) |
|   profile_tier_level(sps_max_sub_layers_minus1) | |
|   sps_seq_parameter_set_id | ue(v) |
|   chroma_format_idc | ue(v) |
|   if(chroma_format_idc = = 3) | |
|     separate_colour_plane_flag | u(1) |
|   ....... | |
|   disable_cross_component_reference_flag | u(1) |
|   if(!disable_cross_component_reference_flag) | |
|     sps_cclm_enabled_flag | u(1) |
|   if(sps_cclm_enabled_flag && chroma_format_idc = = 1) | |
|     sps_celm_colocated_chroma_flag | u(1) |
|   ......... | |
| } | |

In Table 7, disable_cross_component_reference_flag represents a syntax element indicating whether the cross-component referencing process is disabled or not. If the syntax value of disable_cross_component_reference_flag is 1, a technology for enabling the cross-component referencing process may be deactivated.

If the syntax value of disable_cross_component_reference_flag is 0, a sps_cclm_enabled_flag syntax may be parsed. Here, the sps_cclm_enabled_flag syntax represents a syntax indicating whether CCLM is enabled or not. The syntax structure of Table 7 is only an example, and the present disclosure is not limited to it. For example, if the syntax value of disable_cross_component_reference_flag is 0, a syntax indicating whether a cross-component referencing mode other than CCLM is enabled or not may be parsed. Also, for example, the disable_cross_component_reference_flag syntax and/or sps_cclm_enabled_flag syntax may be transmitted through other higher-level syntaxes (e.g., a picture parameter set, a tile group header, etc.).

Moreover, in one embodiment of the present disclosure, a constrained reference level may be used when applying the cross-component referencing process. This will be explained with reference to the following drawings.

FIG. 24 is a diagram for explaining a method for constraining cross-component referencing according to an embodiment to which the present disclosure may be applied.

Referring to FIG. 24, from the viewpoint of parallel decoding, the decoder may refer to a previously parsed component, not a parallelly-processed component. For example, reference may be made to a residual, luma prediction mode, etc. of a previously parsed luma component during decoding of a chroma component.

In the case where the cross-component referencing process is disabled according to the above-explained embodiment, the above-described IC, CCLM, and LM technologies do not allow for referring to decoding data of other components.

However, in this embodiment, the encoder/decoder may refer to data of a previously parsed cross component, as illustrated in FIG. 24.

The above-explained embodiments of the present disclosure may be implemented individually, or one or more of them may be implemented in combination.

FIG. 25 is a flowchart illustrating a method for generating an intra prediction block according to an embodiment to which the present disclosure may be applied.

Referring to FIG. 25, the description will be given focusing on the decoder for convenience of explanation, but the present disclosure is not limited to this and the method for generating an intra prediction block according to an embodiment of the present disclosure may be performed in the same manner in the encoder and decoder.

The decoder parses a syntax element indicating whether a CCLM (cross-component linear mode) intra prediction on a current chroma block is disabled or not (S2501).

As explained previously with reference to FIGS. 16 to 24, the encoder may signal to the decoder a syntax for handling (or on/off) a process for cross-referencing between each component. The syntax element parsed in the step S2501 may be a syntax for handling (or on/off) cross-component referencing, including at least one among DM, CCLM, LM, and IC.

The syntax element parsed in the step S2501 may be transmitted from the encoder in a unit of a picture, a slice, a tile, or a tile group. Also, in one embodiment, a syntax element for enabling the CCLM intra prediction may be transmitted in a unit of a sequence or picture. That is, even in an environment where the CCLM intra prediction is enabled through a higher-level syntax, the CCLM intra prediction enabled at a higher level may be disabled at a lower level (e.g., a unit of a picture, a slice, a tile, or a tile group) for parallel processing between components.

The decoder derives an intra prediction mode applied to the current chroma block (S2502).

In an embodiment, when the CCLM intra prediction is disabled, the intra prediction mode may be derived in a predetermined first prediction mode set. In an embodiment, when the CCLM intra prediction is not disabled, the intra prediction mode may be derived in a predetermined second prediction mode set. In this instance, the second prediction mode set may include intra prediction modes included in the first prediction mode set and the CCLM intra prediction mode.

The decoder generates a prediction sample for the current chroma block based on the intra prediction mode (S2503).

In an embodiment, when the intra prediction mode is the CCLM intra prediction mode, the generating of a prediction sample may comprise: deriving a parameter used for the CCLM intra prediction by using a neighboring sample of a luma block corresponding to the current chroma block and a neighboring sample of the current chroma block; and generating a prediction sample for the current chroma block by using the parameter and a reconstructed sample of the luma block.

As explained previously with reference to FIG. 24, when the CCLM intra prediction is disabled, the current chroma block may be decoded with reference to data of a previously parsed luma block. In an embodiment, when the CCLM intra prediction is disabled, the current chroma block may be decoded with reference to a residual signal of a previously parsed luma block and an intra prediction mode for the previously parsed luma block.

FIG. 26 is a diagram illustrating an intra prediction apparatus according to an embodiment to which the present disclosure may be applied.

Although FIG. 26 illustrates the intra predictor as one block for convenience of explanation, the intra predictor may be implemented as a component included in the encoder and/or decoder.

Referring to FIG. 26, the intra predictor implements the functions, processes, and/or methods proposed earlier with reference to FIGS. 8 to 25. Specifically, the intra predictor may comprise a syntax element parser 2601, an intra prediction mode deriver 2602, and a prediction sample generator 2603.

The syntax element parser 2601 may parse a syntax element indicating whether a CCLM (cross-component linear model) intra prediction on a current chroma block is disabled or not.

As explained previously with reference to FIGS. 16 to 24, the encoder may signal to the decoder a syntax for handling (or on/off) a process for cross-referencing between each component. The syntax element parsed by the syntax element parser 2601 may be a syntax for handling (or on/off) cross-component referencing, including at least one among DM, CCLM, LM, and IC.

The syntax element parsed by the syntax element parser 2601 may be transmitted from the encoder in a unit of a picture, a slice, a tile, or a tile group. Also, in one embodiment, a syntax element for enabling the CCLM intra prediction may be transmitted in a unit of a sequence or picture. That is, even in an environment where the CCLM intra prediction is enabled through a higher-level syntax, the CCLM intra prediction enabled at a higher level may be disabled at a lower level (e.g., a unit of a picture, a slice, a tile, or a tile group) for parallel processing between components.

The intra prediction mode deriver 2602 derives an intra prediction mode applied to the current chroma block.

In an embodiment, when the CCLM intra prediction is disabled, the intra prediction mode may be derived in a predetermined first prediction mode set. In an embodiment, when the CCLM intra prediction is not disabled, the intra prediction mode may be derived in a predetermined second prediction mode set. In this instance, the second prediction mode set may include intra prediction modes included in the first prediction mode set and the CCLM intra prediction mode.

The prediction sample generator 2603 generates a prediction sample for the current chroma block based on the intra prediction mode.

In an embodiment, when the intra prediction mode is the CCLM intra prediction mode, the generating of a prediction sample may comprise: deriving a parameter used for the CCLM intra prediction by using a neighboring sample of a luma block corresponding to the current chroma block and a neighboring sample of the current chroma block; and generating a prediction sample for the current chroma block by using the parameter and a reconstructed sample of the luma block.

As explained previously with reference to FIG. 24, when the CCLM intra prediction is disabled, the current chroma block may be decoded with reference to data of a previously parsed luma block. In an embodiment, when the CCLM intra prediction is disabled, the current chroma block may be decoded with reference to a residual signal of a previously parsed luma block and an intra prediction mode for the previously parsed luma block.

FIG. 27 illustrates a video coding system to which the present disclosure is applied.

A video coding system may include a source device and a receiving device. The source device may forward encoded video/image information or data to the receiving device in a file or streaming format through a digital storage medium or a network.

The source device may include a video source, an encoding apparatus and a transmitter. The receiving device may include a receiver, a decoding apparatus and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display unit, and the display unit may be constructed as an independent device or an external component.

The video source may obtain video/image through processes such as capturing, composing or generating. The video source may include a video/image capturing device and/or a video/image generating device. The video/image capturing device may include one or more cameras, video/image archive including a video/image captured previously, and the like, for example. The video/image generating device may include a computer, a tablet and a smart phone, for example, and may generate video/image (electrically), for example. For example, a virtual video/image may be generated through a computer, and in this case, the video/image capturing process may be substituted by the process of generating a related data.

The encoding apparatus may encode an input video/image. The encoding apparatus may perform a series of processes including a prediction, a transform, a quantization, and the like for compression and coding efficiency.

The transmitter may forward encoded video/image information or data output in a bitstream format to the receiver of the receiving device in a file or streaming format through a digital storage medium or a network. The digital storage medium may include various storage media such as USB, SD, CD, DVD, Blu-ray, HDD, SSD, and the like. The transmitter may include an element for generating a media file through a predetermined file format and may include an element for transmitting through broadcasting/communication network. The receiver may extract the bitstream and forward it to the decoding apparatus.

The decoding apparatus may perform a series of processes including a dequantization, an inverse transform, a prediction, and the like that corresponds to the operation of the encoding apparatus and decode video/image.

The renderer may render the decoded video/image. The rendered video/image may be displayed through the display unit.

FIG. 28 is a configuration diagram of a content streaming system as an embodiment to which the present disclosure is applied.

The content streaming system to which the present disclosure is applied may include an encoding server, a streaming server, a web server, a media storage, a user equipment, and multimedia input devices.

The encoding server serves to compress content input from multimedia input devices such as a smartphone, a camera and a camcorder into digital data to generate a bitstream and transmit the bitstream to the streaming server. As another example, when the multimedia input devices such as a smartphone, a camera and a camcorder directly generate bitstreams, the encoding server may be omitted.

The bitstream may be generated by an encoding method or a bitstream generation method to which the present disclosure is applied and the streaming server can temporarily store the bitstream in the process of transmitting or receiving the bitstream.

The streaming server transmits multimedia data to the user equipment on the basis of a user request through the web server and the web server serves as a medium that informs a user of services. When the user sends a request for a desired service to the web server, the web server delivers the request to the streaming server and the streaming server transmits multimedia data to the user. Here, the content streaming system may include an additional control server, and in this case, the control server serves to control commands/responses between devices in the content streaming system.

The streaming server may receive content from the media storage and/or the encoding server. For example, when content is received from the encoding server, the streaming server can receive the content in real time. In this case, the streaming server may store bitstreams for a predetermined time in order to provide a smooth streaming service.

Examples of the user equipment may include a cellular phone, a smartphone, a laptop computer, a digital broadcast terminal, a PDA (personal digital assistant), a PMP (portable multimedia player), a navigation device, a slate PC, a tablet PC, an ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

The embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blueray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example.

Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:
1. A method for decoding images based on an intra prediction mode, the method comprising:
parsing, by a processor, a first syntax element indicating a composition of components of bitstream data, the composition of components being one of a first structure in which sequential component data comprises each coding tree unit and a second structure in which same component data comprises coding tree units in a unit of specific regions, the component data being one of luma data or chroma data;
parsing, by the processor, information related to entry points for respective component data;
accessing, by the processor, the component data within the bitstream data based on the first syntax element and the information related to the entry points;
parsing, by the processor, a second syntax element indicating whether a CCLM (cross-component linear model) intra prediction on a current chroma block is disabled or not;
deriving, by the processor, an intra prediction mode applied to the current chroma block; and
generating, by the processor, a prediction sample for the current chroma block based on the intra prediction mode,
wherein, when the CCLM intra prediction is disabled, the intra prediction mode is derived in a predetermined first prediction mode set,
when the CCLM intra prediction is not disabled, the intra prediction mode is derived in a predetermined second prediction mode set, and
the second prediction mode set includes intra prediction modes included in the first prediction mode set and the CCLM intra prediction mode.

2. The method of claim 1, wherein, when the intra prediction mode is the CCLM intra prediction mode, the generating of a prediction sample comprises:
deriving, by the processor, a parameter used for the CCLM intra prediction by using a neighboring sample of a luma block corresponding to the current chroma block and a neighboring sample of the current chroma block; and
generating, by the processor, a prediction sample for the current chroma block by using the parameter and a reconstructed sample of the luma block.

3. The method of claim 1, wherein the second syntax element is transmitted from an encoder in a unit of a picture, a slice, a tile, or a tile group.

4. The method of claim 1, wherein, when the CCLM intra prediction is disabled, the current chroma block is decoded with reference to data of a previously parsed luma block.

5. The method of claim 1, wherein, when the CCLM intra prediction is disabled, the current chroma block is decoded with reference to a residual signal of a previously parsed luma block and an intra prediction mode for the previously parsed luma block.

6. The method of claim 1, wherein the information related to the entry points comprises a number of the entry points, and at least one of an offset or a bitlength indicating a position of corresponding component data.

7. The method of claim 1, further comprising:
parsing, by the processor, a first flag indicating whether an entropy initialization for the component data is performed or not; and
performing, by the processor, parallel processing for entropy decoding on each component data based on the first flag.

8. The method of claim 7, further comprising:
parsing, by the processor, a second flag indicating whether corresponding component data is collected or not; and
collecting, by the processor, the corresponding component data without applying the entropy initialization based on the second flag and performing the entropy decoding based on accumulated probability.

9. A method for encoding images based on an intra prediction mode, comprising:
generating, by a processor, a first syntax element indicating a composition of components of bitstream data, the composition of components being one of a first structure in which sequential component data comprises each coding tree unit and a second structure in which same component data comprises coding tree units in a unit of specific regions, the component data being one of luma data or chroma data;
generating, by the processor, information related to entry points for respective component data;
generating, by the processor, a prediction sample for a current chroma block based on an intra prediction mode;
generating, by the processor, a residual sample for the current chroma block based on the prediction sample for the current chroma block; and
generating, by the processor, a second syntax element indicating whether a cross-component linear model (CCLM) intra prediction on the current chroma block is disabled or not,
wherein, when the intra prediction mode is determined from a predetermined first prediction mode set, the CCLM intra prediction is disabled,
when the intra prediction mode is determined from a predetermined second prediction mode set, the CCLM intra prediction is not disabled, and
the second prediction mode set includes intra prediction modes included in the first prediction mode set and the CCLM intra prediction mode.

10. The method of claim 9, wherein the second syntax element is transmitted from an encoder in a unit of a picture, a slice, a tile, or a tile group.

11. The method of claim 9, wherein, when the CCLM intra prediction is disabled, the current chroma block is encoded with reference to data of a previously constructed luma block.

12. The method of claim 9, wherein, when the CCLM intra prediction is disabled, the current chroma block is encoded with reference to a residual signal of a previously constructed luma block and an intra prediction mode for the previously constructed luma block.

13. The method of claim 9, wherein the information related to the entry points comprises a number of the entry points, and at least one of an offset or a bitlength indicating a position of corresponding component data.

14. The method of claim 9, further comprising:
generating, by the processor, a first flag indicating whether an entropy initialization for the component data is performed or not.

15. The method of claim 14, further comprising:
generating, by the processor, a second flag indicating whether corresponding component data is collected or not.

16. A non-transitory decoder-readable storage medium for storing a bitstream generated based on the method of claim 9.

* * * * *